(12) United States Patent
He

(10) Patent No.: US 11,959,561 B2
(45) Date of Patent: Apr. 16, 2024

(54) ELECTRONIC EXPANSION VALVE AND REFRIGERATION SYSTEM

(71) Applicant: ZHEJIANG DUNAN ARTIFICIAL ENVIRONMENT CO., LTD., Zhejiang (CN)

(72) Inventor: Yuchen He, Zhejiang (CN)

(73) Assignee: ZHEJIANG DUNAN ARTIFICIAL ENVIRONMENT CO., LTD., Zhejiang (CN)

(*) Notice: Subject to any disclaimer, the term of this patent is extended or adjusted under 35 U.S.C. 154(b) by 137 days.

(21) Appl. No.: 17/438,478

(22) PCT Filed: Jan. 17, 2020

(86) PCT No.: PCT/CN2020/072816
§ 371 (c)(1),
(2) Date: Sep. 13, 2021

(87) PCT Pub. No.: WO2020/181922
PCT Pub. Date: Sep. 17, 2020

(65) Prior Publication Data
US 2022/0154851 A1      May 19, 2022

(30) Foreign Application Priority Data

Mar. 13, 2019   (CN) .......................... 201920318827.5
Apr. 29, 2019   (CN) .......................... 201920610418.2
(Continued)

(51) Int. Cl.
*F16K 47/02*      (2006.01)
*F16K 27/10*      (2006.01)
(Continued)

(52) U.S. Cl.
CPC ............ *F16K 47/02* (2013.01); *F16K 27/102* (2013.01); *F16K 31/50* (2013.01); *F25B 41/34* (2021.01)

(58) Field of Classification Search
CPC .......... F25B 41/31; F25B 41/34; F16K 47/02; F16K 27/102; F16K 31/50
See application file for complete search history.

(56) References Cited

U.S. PATENT DOCUMENTS

| 6,415,985 B1* | 7/2002 | Minowa ................ F25B 41/335 |
| | | 236/92 B |
| 6,561,480 B1* | 5/2003 | Komiya ................ F25B 41/347 |
| | | 251/129.05 |

(Continued)

FOREIGN PATENT DOCUMENTS

| CN | 2000-18774 A | 1/2000 |
| CN | 202126120 U | 1/2012 |

(Continued)

*Primary Examiner* — Jessica Cahill
(74) *Attorney, Agent, or Firm* — Samson G. Yu

(57) ABSTRACT

Disclosed are an electronic expansion valve and a refrigeration system. The electronic expansion valve includes: a valve seat provided with an inlet, an outlet and a communication channel in communication with the inlet and the outlet; an actuator movably mounted in the valve seat, wherein the actuator is provided with a first position to block the communication channel and a second position to avoid the communication channel; and a driving mechanism connected with the actuator to drive the actuator to move between the first position and the second position, wherein the driving mechanism includes noise reduction members to reduce noise of the electronic expansion valve.

32 Claims, 25 Drawing Sheets

(30) Foreign Application Priority Data

Apr. 29, 2019 (CN) .......................... 201920610419.7
Apr. 29, 2019 (CN) .......................... 201920610538.2

(51) Int. Cl.
*F16K 31/50* (2006.01)
*F25B 41/34* (2021.01)

(56) References Cited

U.S. PATENT DOCUMENTS

| | | | |
|---|---|---|---|
| 9,322,582 B2 * | 4/2016 | Zhan | .............. F16K 39/024 |
| 10,982,792 B2 * | 4/2021 | Uehara | .............. F16K 37/0041 |
| 11,555,637 B2 * | 1/2023 | Wang | .............. F25B 41/31 |
| 2021/0041028 A1 * | 2/2021 | Tang | .............. F16K 1/48 |

FOREIGN PATENT DOCUMENTS

| | | |
|---|---|---|
| CN | 102506526 A | 6/2012 |
| CN | 102661639 A | 9/2012 |
| CN | 102878730 A | 1/2013 |
| CN | 105650337 A | 6/2016 |
| CN | 104295784 B | 9/2016 |
| CN | 106151554 A | 11/2016 |
| CN | 104180567 B | 8/2017 |
| CN | 107420566 A | 12/2017 |
| CN | 107461498 A | 12/2017 |
| CN | 107461526 A | 12/2017 |
| CN | 107642927 A | 1/2018 |
| CN | 206861006 U | 1/2018 |
| CN | 108506548 A | 9/2018 |
| CN | 207864635 U | 9/2018 |
| CN | 208252794 U | 12/2018 |
| CN | 109323006 A | 2/2019 |
| CN | 209926669 U | 1/2020 |
| EP | 3220079 A1 * | 9/2017 ............. F16K 31/06 |
| JP | 1994265038 A | 9/1994 |
| JP | 1996296758 A | 11/1996 |
| JP | 1997072454 A | 3/1997 |
| JP | 2016223751 A | 12/2016 |
| JP | 2017203508 A | 11/2017 |
| JP | 2017534822 A | 11/2017 |
| JP | 2018116926 A | 7/2018 |
| WO | 2018175685 A1 | 9/2018 |

* cited by examiner

ELECTRONIC EXPANSION VALVE AND REFRIGERATION SYSTEM

CROSS REFERENCE TO RELATED APPLICATION(S)

The present disclosure is a national stage application of International Patent Application No. PCT/CN2020/072816, which is filed on Jan. 17, 2020.

TECHNICAL FIELD

The present disclosure relates to the technical field of valves, and particularly relates to an electronic expansion valve and a refrigeration system.

BACKGROUND

At present, the electronic expansion valve is widely used for fluid throttle and flow regulation. Based on a principle of a stepping electric motor, a rotor in the electronic expansion valve is driven by a coil to rotate forwards and reversely, and then drives a valve needle to ascend or descend, so as to change a flow area of an inlet of the valve, thereby regulating and controlling the flow. In an electronic expansion valve known to inventors, due to the clearance fit at multiple positions, components, for example, a lead screw, a rotor and a connection sleeve assembly, in the valve will shake and collide when moving or being impacted by the fluid, resulting in noise and accelerating abrasion.

SUMMARY

Some embodiments of the present disclosure provide an electronic expansion valve and a refrigeration system to solve the problem that an electronic expansion valve produces high noise in an art known to inventors.

Some embodiments of the present disclosure provide an electronic expansion valve. The electronic expansion valve includes: a valve seat provided with an inlet, an outlet and a communication channel in communication with the inlet and the outlet; an actuator movably mounted in the valve seat, where the actuator may be provided with a first position to block the communication channel and a second position to avoid the communication channel; and a driving mechanism connected to the actuator to drive the actuator to move between the first position and the second position, where the driving mechanism includes noise reduction members to reduce noise of the electronic expansion valve.

In some embodiments, the driving mechanism further includes a connection sleeve assembly, a guide sleeve and a first noise reduction member, the guide sleeve being fixed in the valve seat, the connection sleeve assembly being connected to the actuator, the connection sleeve assembly being movably arranged in the guide sleeve, and the first noise reduction member being arranged between the guide sleeve and the connection sleeve assembly.

In some embodiments, the guide sleeve includes a first channel and a second channel which are in communication, the second channel is in communication with the communication channel of the valve seat, the connection sleeve assembly is movably arranged in the first channel, the actuator is at least partially arranged in the second channel, and the first noise reduction member is arranged between the second channel and the connection sleeve assembly.

In some embodiments, a first mounting groove is provided in an outer wall of the connection sleeve assembly and/or an inner wall of the first channel, and the first noise reduction member is mounted in the first mounting groove.

In some embodiments, the first noise reduction member includes an elastic O-ring or a piston cup, and the first noise reduction member is in interference fit in a horizontal direction.

In some embodiments, the driving mechanism further includes a rotor, a lead screw, a nut seat and a second noise reduction member, the rotor being connected to the lead screw, the lead screw penetrating into the nut seat, the lead screw being connected to the actuator by a connection sleeve assembly, and the second noise reduction member being arranged between the lead screw and the nut seat.

In some embodiments, the driving mechanism further includes a rotor, a lead screw, a nut seat and a second noise reduction member, the rotor being connected to the lead screw, the lead screw penetrating into the nut seat, the lead screw being connected to the actuator by the connection sleeve assembly, and the second noise reduction member being arranged between the lead screw and the nut seat.

In some embodiments, the lead screw includes a guide section, an external thread section and a transition section, a first end of the transition section being connected with an end, close to the actuator, of the external thread section, and a second end of the transition section being connected to the guide section.

In some embodiments, the nut seat includes an internal thread section and an unthreaded hole section, wherein the external thread section cooperates with the internal thread section, the guide section is arranged corresponding to the unthreaded hole section, the guide section is in clearance fit with the unthreaded hole section, and a nominal diameter of the external thread section is smaller than an inner diameter of the unthreaded hole section.

In some embodiments, a second mounting groove is provided in the guide section and/or the unthreaded hole section, and the second noise reduction member is mounted in the second mounting groove.

In some embodiments, the second noise reduction member includes an elastic O-ring or a piston cup, and the second noise reduction member is in interference fit in the horizontal direction.

In some embodiments, the nut seat further includes an open groove, the open groove being in communication with the unthreaded hole section, and an inner diameter of the open groove being larger than the inner diameter of the unthreaded hole section, and the guide sleeve is at least partially clamped in the open groove.

In some embodiments, the driving mechanism further includes a lead screw, a nut seat and a third noise reduction member, the lead screw penetrating into the nut seat, and the third noise reduction member being arranged between the lead screw and the nut seat.

In some embodiments, the lead screw includes a fixed section and an external thread section, and the nut seat includes an internal thread section and an unthreaded hole section, the external thread section cooperating with the internal thread section, the fixed section being arranged corresponding to the unthreaded hole section, and the third noise reduction member being located between the fixed section and the unthreaded hole section.

In some embodiments, the fixed section is located on a side, away from the actuator, of the external thread section.

In some embodiments, a first mounting portion is arranged on the fixed section and/or the unthreaded hole section, and the third noise reduction member is at least partially mounted in the first mounting portion.

In some embodiments, the first mounting portion includes an annular groove.

In some embodiments, the third noise reduction member includes an O-ring or a piston cup.

In some embodiments, the driving mechanism further includes a guide sleeve, a connection sleeve assembly and a fourth noise reduction member, the guide sleeve being located in the valve seat, and the connection sleeve assembly being at least partially located in the guide sleeve, and the lead screw is connected to the actuator by the connection sleeve assembly.

In some embodiments, the fourth noise reduction member is arranged between the guide sleeve and the connection sleeve assembly.

In some embodiments, a second mounting portion is provided on an outer wall of the connection sleeve assembly and/or an inner wall of the guide sleeve, and the fourth noise reduction member is at least partially mounted in the second mounting portion.

In some embodiments, the second mounting portion includes an annular groove, and the fourth noise reduction member includes an O-ring or a piston cup.

In some embodiments, the driving mechanism includes a guide sleeve and a fifth noise reduction member, the guide sleeve being located in the valve seat, the actuator being at least partially arranged in the guide sleeve, and the fifth noise reduction member being arranged between the guide sleeve and the actuator.

In some embodiments, the driving mechanism further includes a rotor, a lead screw, a nut seat and a connection sleeve assembly, the rotor being connected to the lead screw, the lead screw penetrating into the nut seat, the connection sleeve assembly being located in the guide sleeve, and the lead screw being connected to the actuator by the connection sleeve assembly.

In some embodiments, the guide sleeve includes a first channel and a second channel which are connected and coaxial, the first channel being located on a side, away from the inlet, of the second channel, and the second channel being in communication with the communication channel of the valve seat, the connection sleeve assembly is arranged in the first channel, the actuator is at least partially arranged in the second channel, and the fifth noise reduction member is arranged between the actuator and a wall surface of the second channel.

In some embodiments, a first mounting groove is provided in an outer wall of the actuator and/or the wall surface of the second channel, and the fifth noise reduction member is at least partially mounted in the first mounting groove.

In some embodiments, the guide sleeve includes a guide sleeve body and a first pressing block, the first pressing block being detachably fixed on the guide sleeve body, and the first pressing block being provided with a first through hole, the actuator at least partially penetrates the first through hole, and the fifth noise reduction member is arranged between the guide sleeve body and the first pressing block.

In some embodiments, in a direction from a position close to the inlet to a position away from the inlet, the second channel sequentially includes a first sub-channel section, a second sub-channel section and a third sub-channel section, a diameter of the first sub-channel section being larger than a diameter of the second sub-channel section, and the diameter of the second sub-channel section being larger than a diameter of the third sub-channel section, an outer diameter of the actuator matches the third sub-channel section, the first pressing block sequentially includes a first step section and a second step section in a direction from a position away from the inlet to a position close to the inlet, the first step section is nested in the first sub-channel section, and the fifth noise reduction member is arranged in a space defined by an end face of the first step section, the second channel section and the actuator.

In some embodiments, the guide sleeve further includes a pressing block groove provided between the first channel and the second channel and arranged coaxial with the first channel and the second channel, a first mounting groove is provided in a wall surface of a side, close to the first channel, of the second channel, a side surface, close to the connection sleeve assembly, of the first mounting groove is in communication with the pressing block groove, the fifth noise reduction member is arranged in the first mounting groove, and the first pressing block is fixed in the pressing block groove, so as to prevent the fifth noise reduction member from moving close to the connection sleeve assembly.

In some embodiments, an annular groove is provided in a side, away from the connection sleeve assembly, of the guide sleeve body, the annular groove is connected with the first channel, the first pressing block is mounted in the annular groove, the actuator at least partially penetrates the first channel, the first channel is in clearance fit with the actuator, the first mounting groove is provided in the wall surface of the second channel, and the fifth noise reduction member is at least partially mounted in the first mounting groove.

In some embodiments, the driving mechanism further includes a six noise reduction member, the six noise reduction member being arranged between the lead screw and the nut seat.

In some embodiments, the lead screw includes a fixed section and an external thread section, the fixed section being located on a side, away from the actuator, of the external thread section, and the nut seat includes an internal thread section and an unthreaded hole section, the external thread section cooperating with the internal thread section, and the fixed section being arranged corresponding to the unthreaded hole section.

In some embodiments, a second mounting groove is provided in an outer wall of the fixed section and/or an inner wall of the unthreaded hole section, and the six noise reduction member is at least partially mounted in the second mounting groove.

In some embodiments, the nut seat further includes a second pressing block, the second pressing block being detachably arranged on a side, away from the actuator, of the unthreaded hole section, a second mounting groove is provided in an end face, connected to the second pressing block, of the unthreaded hole section, and the six noise reduction member is at least partially mounted in the second mounting groove.

In some embodiments, a first connection pipe sleeves an end of the valve seat; the end of the valve seat is provided with an annular groove structure and provided with a boss structure connected to the annular groove structure; a welding ring is clamped into a groove of the annular groove structure and connected to an inner wall of the first connection pipe; and the valve seat is in clearance fit with the first connection pipe, and the welding ring is in interference fit with the first connection pipe.

In some embodiments, the valve seat includes a first mounting pipe and a second mounting pipe connected in an axial direction, an outer diameter of the first mounting pipe is larger than an outer diameter of the second mounting pipe, the first connection pipe sleeves the second mounting pipe, and the boss structure and the annular groove structure are arranged on the second mounting pipe.

In some embodiments, a side wall of the first mounting pipe is provided with an insertion hole; and the electronic expansion valve further includes: a second connection pipe inserted into the insertion hole and in communication with the first connection pipe by the valve seat.

In some embodiments, the first connection pipe includes a sleeve section and an extension section; the sleeve section sleeves on the second mounting pipe and is perpendicular to the first connection pipe; and the extension section is connected to the sleeve section.

In some embodiments, an end, connected to the second mounting pipe, of the first mounting pipe is provided with an annular slot, and the first connection pipe is inserted into the annular slot.

In some embodiments, an accommodation cavity is arranged in the valve seat, the accommodation cavity being in communication with the first connection pipe and the second connection pipe; and the electronic expansion valve further includes: a valve needle arranged in the valve seat and provided with a needle head arranged towards the second mounting pipe, a maximum outer diameter of the needle head being larger than an inner diameter of the second mounting pipe.

In some embodiments, the electronic expansion valve further includes: a cover body mounted on the valve seat, the accommodation cavity being defined by the cover body and the valve seat; a lifting assembly arranged in the accommodation cavity, having a central axis coinciding with a central axis of the valve seat, and configured to rotate to drive the valve needle to ascend and descend along the central axis of the valve seat; a rotor assembly rotationally mounted in the cover body; and a lead screw assembly mounted in the cover body and having an axial limiting end connected to the lifting assembly, where the rotor assembly is arranged around the lead screw assembly and is configured to drive the lead screw assembly to rotate and axially move.

In some embodiments, the lifting assembly includes a spring, a gasket and a ball; the spring is mounted in the lifting assembly, one end of the spring is connected to the lead screw assembly, the other end of the spring is connected to the gasket and is connected to the valve needle by the ball, and the ball is disposed between the gasket and the valve needle.

In some embodiments, the electronic expansion valve is mounted between a liquid storage barrel and an evaporator, and a refrigerant in the liquid storage barrel is transferred to the evaporator by the electronic expansion valve; and the electronic expansion valve further includes: a thermistor arranged at an outlet of the evaporator and connected in parallel to a stator assembly fixed on a positioning sheet of the valve seat and then to a power supply.

In the other aspect of the present disclosure, further provided is a refrigeration system, including a liquid storage container, an evaporator, and a control valve, where a refrigerant in the liquid storage container is transferred to the evaporator by means of the control valve, and the control valve is the above electronic expansion valve.

According to the technical solution of the present disclosure, the electronic expansion valve includes a valve seat, an actuator and a driving mechanism, where the valve seat includes an inlet, an outlet and a communication channel in communication with the inlet and the outlet, and the driving mechanism is connected with the actuator so as to move the actuator up and down. Fluid enters the electronic expansion valve from the inlet, and the driving mechanism drives the actuator to block the communication channel or avoid the communication channel to different degrees, so as to close the electronic expansion valve or open the electronic expansion valve to different degrees. The driving mechanism includes the noise reduction member, so when the electronic expansion valve is used, the noise reduction member may reduce noise of the driving mechanism, thereby greatly reducing the noise produced by the electronic expansion valve. The technical solution of the present disclosure effectively solves the problem that an electronic expansion valve produces high noise in the art known to inventors.

BRIEF DESCRIPTION OF THE DRAWINGS

Drawings of the description for constituting a part of the present disclosure are used to provide further understanding of the present disclosure, and exemplary embodiments of the present disclosure and descriptions thereof are used to explain the present disclosure, and do not constitute improper limitation to the present disclosure. In the drawings.

Herein, the above drawings include the following reference signs:

10, valve seat; 11, inlet; 12, outlet; 13, communication channel; 20, actuator; 30, driving mechanism; 1-21, 1-22, 1-31, lead screw; 1-311, guide section; 1-312, external thread section; 1-315, transition section; 1-32, nut seat; 1-321, internal thread section; 1-322, unthreaded hole section; 1-323, open groove; 1-33, first noise reduction member; 1-40, guide sleeve; 1-34, second noise reduction member; 1-35, connection sleeve assembly; 1-351, spring sleeve; 1-352, gasket; 1-353, bearing; 1-354, pressing sleeve; 1-355, spring; 1-36, rotor; 1-40, guide sleeve; 1-41, balance hole; 1-50, housing;

2-21, fixing portion; 2-22, limiting portion; 2-23, guide portion; 2-24, throttling portion; 2-31, lead screw; 2-311, fixed section; 2-312, external thread section; 2-314, limiting section; 2-32, nut seat; 2-32, nut seat; 2-321, internal thread section; 2-322, unthreaded hole section; 2-323, open groove; 2-34, fourth noise reduction member; 2-35, connection sleeve assembly; 2-351, spring sleeve; 2-352, gasket; 2-353, bearing; 2-354, pressing sleeve; 2-355, spring; 2-36, rotor; 2-40, guide sleeve; 2-41, balance hole; 2-50, housing; 3-21, fixing portion; 3-22, limiting portion; 3-23, guide portion; 3-24, throttling portion; 3-31, lead screw; 3-311, fixed section; 3-312, external thread section; 3-313, guide section; 3-314, limiting section; 3-32, nut seat; 3-321, internal thread section; 3-322, unthreaded hole section; 3-323, open groove; 3-324, second pressing block; 3-33, fifth noise reduction member; 3-34, sixth noise reduction member; 3-35, connection sleeve assembly; 3-351, spring sleeve; 3-352, gasket; 3-353, bearing; 3-354, pressing sleeve; 3-355, spring; 3-36, rotor; 3-40, guide sleeve; 3-41, guide sleeve body; 3-42, first pressing block; 3-50, housing;

4-2, first connection pipe; 4-3, welding ring; 4-4, second connection pipe; 4-5, valve needle; 4-6, cover body; 4-7, lifting assembly; 4-8, rotor assembly; 4-14, second mounting pipe; 4-71, spring; 4-72, gasket; 4-73, ball; 4-131, insertion hole.

DETAILED DESCRIPTION OF THE EMBODIMENTS

It should be noted that the embodiments of the disclosure and the features of the embodiments may be combined with each other without conflict. The present disclosure will be described in detail below with reference to the accompanying drawings in conjunction with embodiments.

Figure 1:
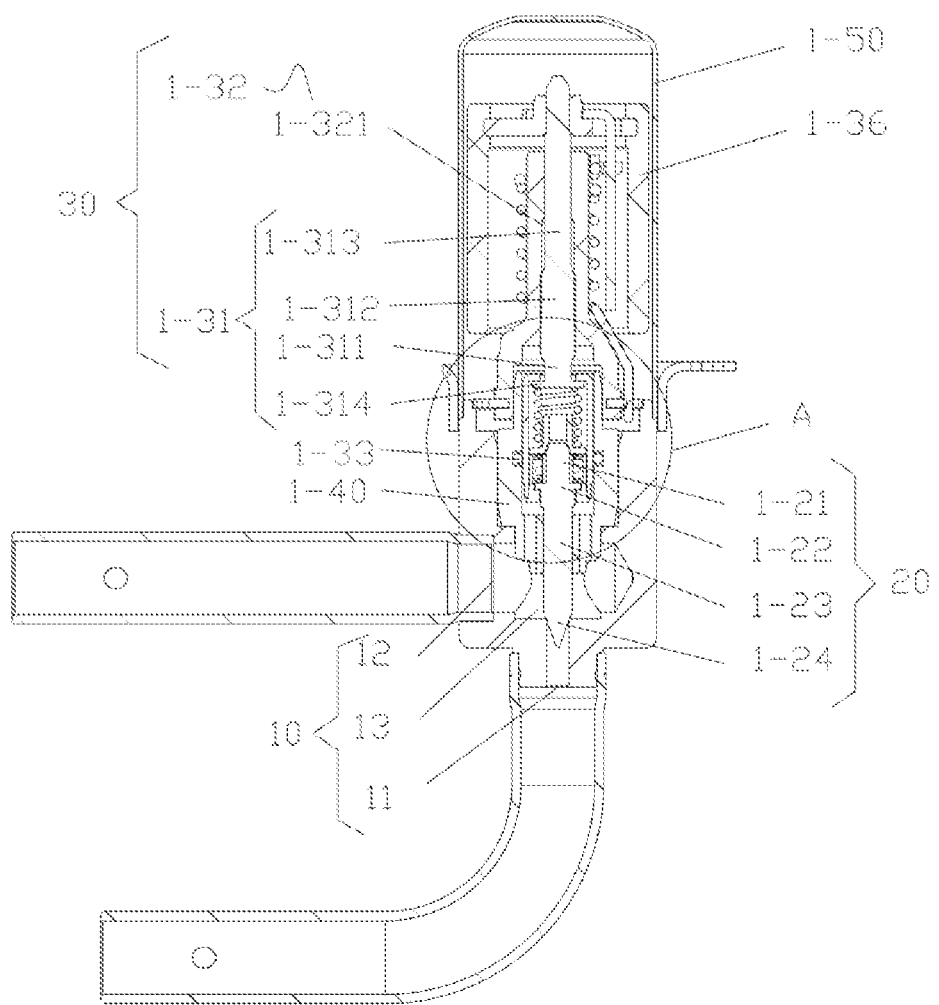
FIG. 1 shows a schematic cross sectional view of a front view of an electronic expansion valve provided in a first embodiment according to the present disclosure.
Figure 2:
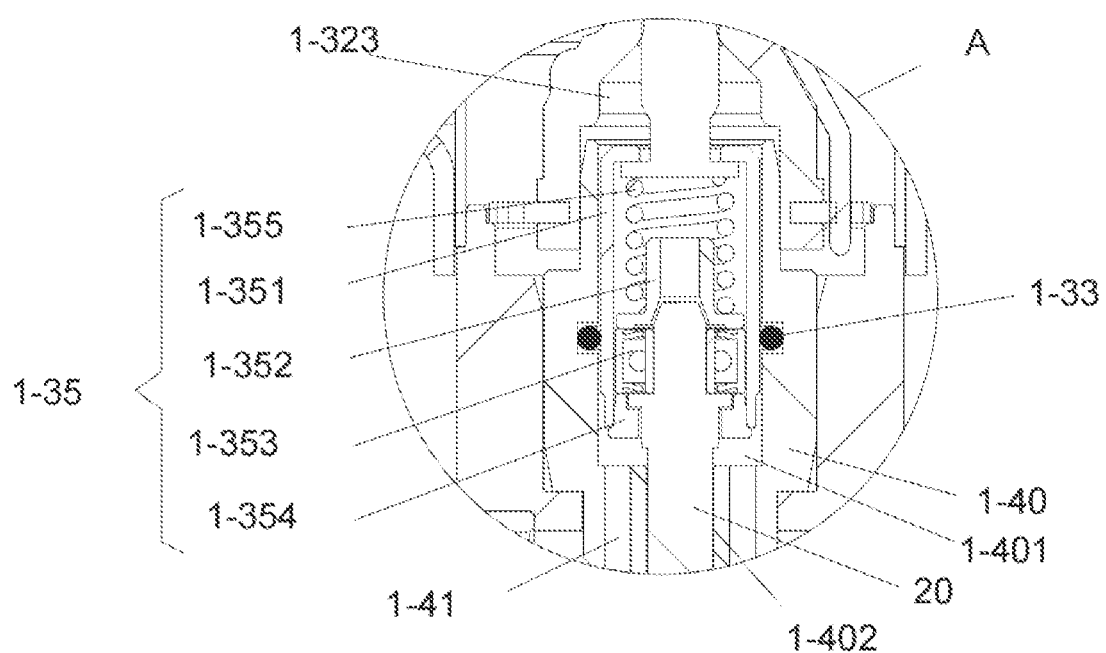
FIG. 2 shows a partial enlarged diagram at A of the electronic expansion valve provided in the first embodiment in FIG. 1.
Figure 5:
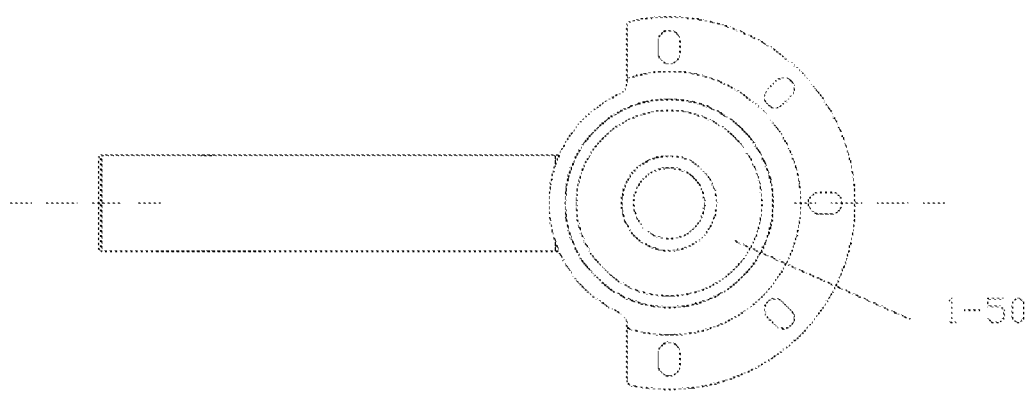
FIG. 5 shows a top view of the electronic expansion valve provided of the first embodiment in FIG. 1.

As shown in FIGS. 1, 2 and 5, an electronic expansion valve of Embodiment 1 includes: a valve seat 10, an actuator 20, a driving mechanism 30 and a guide sleeves 1-40, where the valve seat 10 is provided with an inlet 11, an outlet 12 and a communication channel 13 in communication with the inlet 11 and the outlet 12; the actuator 20 is movably mounted in the valve seat 10, the actuator 20 is provided with a first position to block the communication channel 13 and a second position to avoid the communication channel 13; the driving mechanism 30 is connected to the actuator 20 to drive the actuator 20 to move between the first position and the second position; and the guide sleeve 1-40 is fixed in the valve seat 10, the driving mechanism 30 includes a connection sleeve assembly 1-35, the connection sleeve assembly 1-35 is connected to the actuator 20, the connection sleeve assembly 1-35 is movably arranged in the guide sleeve 1-40, the driving mechanism 30 further includes a first noise reduction member 1-33, and the first noise reduction member 1-33 is arranged between the guide sleeve 1-40 and the connection sleeve assembly 1-35.

According to the technical solution of Embodiment 1, the electronic expansion valve includes the valve seat 10, the actuator 20 and the driving mechanism 30, where the valve seat 10 includes the inlet 11, the outlet 12 and the communication channel 13 in communication with the inlet 11 and the outlet 12, and the driving mechanism 30 is connected to the actuator 20 so as to move the actuator 20 up and down. Fluid enters the electronic expansion valve from the inlet 11, and the driving mechanism 30 drives the actuator 20 to block or avoid the communication channel 13 to different degrees, so as to close or open the electronic expansion valve to different degrees. The driving mechanism 30 further includes the guide sleeve 1-40, the driving mechanism 30 includes the connection sleeve assembly 1-35 and the first noise reduction member 1-33, where the connection sleeve assembly 1-35 is movably arranged in the guide sleeve 1-40, the connection sleeve assembly 1-35 is in clearance fit with the guide sleeve 1-40, the first noise reduction member 1-33 is arranged between the connection sleeve assembly 1-35 and the guide sleeve 1-40, and accordingly, the connection sleeve assembly 1-35 and the driving mechanism 30 and the actuator 20 which are connected to the connecting sleeve assembly 1-35 operate more stably, thereby reducing noise. The technical solution of Embodiment 1 effectively solves the problem that an electronic expansion valve produces high noise due to clearance fit between a connection sleeve assembly and a guide sleeve in the art known to inventors. Specifically, the communication channel includes a valve port, and a valve needle matches the valve port to open or close the electronic expansion valve.

As shown in FIG. 1, in the technical solution of Embodiment 1, the guide sleeve 1-40 includes a first channel and a second channel which are in communication, the second channel is in communication with the communication channel 13 of the valve seat 10, the connection sleeve assembly 1-35 is movably arranged in the first channel, the actuator 20 is at least partially arranged in the second channel, and the first noise reduction member 1-33 is arranged between the second channel and the connection sleeve assembly 1-35. A balance hole 1-41 is further provided in a circumferential outer side of the second channel and in communication with the first channel and the communication channel 13 of the valve seat 10, so as to balance upper pressure and lower pressure of the guide sleeve 1-40. The connection sleeve assembly 1-35 is movable in the first channel, the first channel is in clearance fit with the connection sleeve assembly 1-35, the connection sleeve assembly 1-35 includes a spring sleeve 1-351, a gasket 1-352, a bearing 1-353, a pressing sleeve 1-354 and a spring 1-355, the actuator 20 includes a valve needle, the valve needle includes a fixing portion 1-21, a limiting portion 1-22, a guide portion 1-23 and a throttling portion 1-24, the lead screw 1-31 further includes a guide section 1-311 and a limiting section 1-314, a first end of the spring 1-355 abuts against the limiting section 1-314 of the lead screw 1-31, and a second end of the spring 1-355 abuts against the gasket 1-352. The spring sleeve 1-351 is arranged on an outer circumference of the spring 1-355 in a sleeving manner, a via hole is provided in an upper end of the spring sleeve 1-351, the guide section 1-311 of the lead screw 1-31 passes through the via hole, a diameter of the limiting portion 1-22 of the valve needle is larger than that of the fixing portion 1-21, the bearing 1-353 is arranged between the limiting portion 1-22 and the gasket 1-352, and the bearing 1-353 may prevent the valve needle from rotating when the valve needle makes contact with the valve port, so as to prevent the communication channel 13 and the throttling portion 1-24 from being worn. The pressing sleeve 1-354 is arranged at a lower end of the spring sleeve 1-351. A through hole is provided in a middle of the pressing sleeve 1-354, the guide portion 1-23 of the valve needle penetrates out of the through hole and is located in the second channel of the guide sleeve 1-40, the pressing sleeve 1-354 limits the limiting portion 1-22 of the valve needle in the spring sleeve 1-351, and an axial gap is defined between the limiting portion 1-22 of the valve needle and the pressing sleeve 1-354, so the valve needle may rotate freely, and no relative rotation friction occurs when the throttling portion makes contact with the communication channel 13. The throttling portion 1-24 of the valve needle cooperates with the communication channel 13 of the valve seat 10, the connection sleeve assembly 1-35 drives the valve needle to move upwards, the throttling portion 1-24 avoids the communication channel 13, the fluid passes through the electronic expansion valve, the connection sleeve assembly 1-35 drives the valve needle to move downwards, the throttling portion 1-24 blocks the communication channel 13, a diameter of the throttling portion 1-24 is gradually increased from one end close to the communication channel 13 to one end far away from the communication channel 13, and when the throttling portion 1-24 blocks the communication channel 13, under a condition that the diameter, cooperating with the communication channel 13, of the throttling portion 1-24 is different, a flow area of the communication channel 13 is different.

As shown in FIGS. 1 and 2, in the technical solution of Embodiment 1, a first mounting groove is provided in an outer wall of the connection sleeve assembly 1-35 and/or an inner wall of the first channel, and the first noise reduction member 1-33 is mounted in the first mounting groove. In some embodiments, the first mounting groove is generally an annular groove which is easy to machine, and the first mounting groove may also be machined into a groove with other shapes, for example, a spiral shape. The first mounting groove may limit an axial movement of the first noise reduction member 1-33, and when the spring sleeve 1-351 moves up and down, the first noise reduction member 1-33 does not move freely.

As shown in FIGS. 1 and 2, in the technical solution of Embodiment 1, the first noise reduction member 1-33 includes an elastic O-ring or a piston cup, and the first noise reduction member 1-33 is in interference fit in a horizontal direction. The first noise reduction member 1-33 is pressed between the guide sleeve 1-40 and the spring sleeve 1-351, such that the connection sleeve assembly 1-35 operates more stably in the guide sleeve 1-40, so as to reduce collision and noise. The O-ring and piston cup are readily available, do not require separate design and machining, and are inexpensive. Certainly, the first noise reduction member 1-33 may also be of other shapes, but the shape of the first noise reduction member 1-33 needs to match a shape of the first mounting groove, and friction caused by the first noise reduction member 1-33 may not be too large, which needs to guarantee that the spring sleeve 1-351 moves smoothly. In some embodiments, the first noise reduction member 1-33 is made of rubber, and the rubber is low in price and has certain elasticity, so the first noise reduction member 1-33 is tightly clamped between the guide sleeve 1-40 and the spring sleeve 1-351 without damaging the spring sleeve 1-351 and the guide sleeve 1-40.

Figure 3:
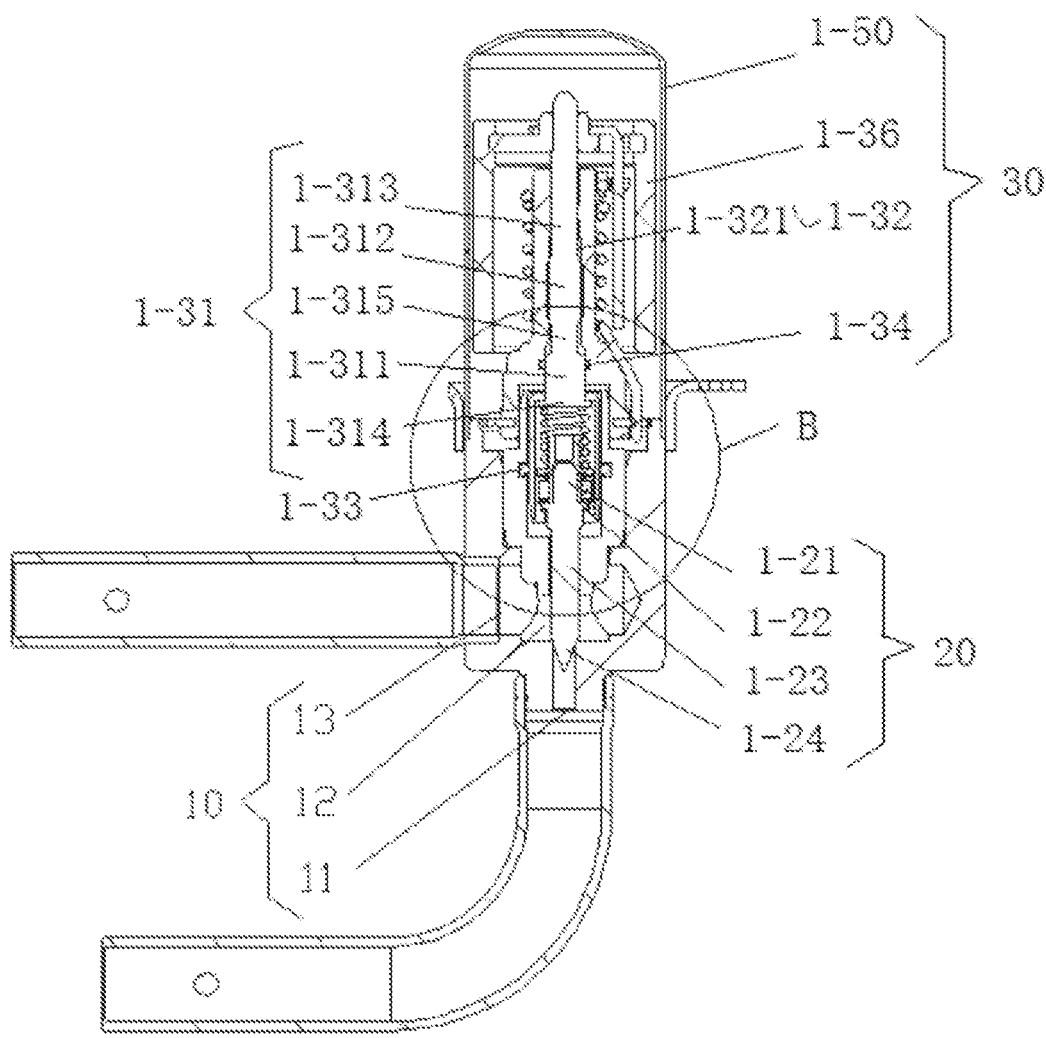
FIG. 3 shows a section view of a main view of an electronic expansion valve provided in a second embodiment according to the present disclosure.

As shown in FIG. 3, the technical solution of Embodiment 2 has difference from the technical solution of Embodiment 1 that the driving mechanism 30 further includes a rotor 1-36, a lead screw 1-31, a nut seat 1-32 and a second noise reduction member 1-34, the rotor 1-36 is connected to the lead screw 1-31, the lead screw 1-31 penetrates into the nut seat 1-32, the lead screw 1-31 is connected to the actuator 20 by the connection sleeve assembly 1-35, and the second noise reduction member 1-34 is arranged between the lead screw 1-31 and the nut seat 1-32. The electronic expansion valve further includes a housing 1-50, where the housing 1-50 and the valve seat 10 are welded together, a rotor 1-36 is arranged in the housing 1-50, the rotor 1-36 includes a permanent magnet, the rotor 1-36 is fixedly connected to the lead screw 1-31, the nut seat 1-32 is fixed to the valve seat 10, a coil is wound around the housing 1-50, and magnetic attraction or repulsion is generated between a magnetic pole of the rotor 1-36 and a magnetic pole generated by induction of the coil, such that the rotor 1-36 rotates, so as to drive the lead screw 1-31 to rotate, since the lead screw 1-31 is in threaded connection to the nut seat 1-32, the lead screw 1-31 moves up and down while rotating, so as to drive the actuator 20 to move up and down, and the rotor 1-36 also moves up and down while the lead screw 1-31 moves up and down. The second noise reduction member 1-34 is arranged between the lead screw 1-31 and the nut seat 1-32, such that the lead screw 1-31 operates more stably, so as to reduce the noise.

As shown in FIG. 3, in the technical solution of Embodiment 2, the lead screw 1-31 includes a guide section 1-311, an external thread section 1-312 and a transition section 1-315, a first end of the transition section 1-315 is connected with one end, close to the actuator 20, of the external thread section 1-312, and a second end of the transition section 1-315 is connected with the guide section 1-311. A length of the guide section 1-311 of the lead screw 1-31 is larger than that of the guide section of the electronic expansion valve in Embodiment 1. A diameter of the guide section 1-311 is larger than that of the transition section 1-315, and larger than a nominal diameter of the external thread section 1-312.

As shown in FIG. 3, in the technical solution of Embodiment 2, the nut seat 1-32 includes an internal thread section 1-321 and an unthreaded hole section 1-322, the external thread section 1-312 cooperates with the internal thread section 1-321, the guide section 1-311 is arranged corresponding to the unthreaded hole section 1-322, the guide section 1-311 is in clearance fit with the unthreaded hole section 1-322, and a nominal diameter of the external thread section 1-312 is smaller than an inner diameter of the unthreaded hole section 1-322. Thus, it is easier to fit the lead screw 1-31 into the nut seat 1-32.

Figure 4:
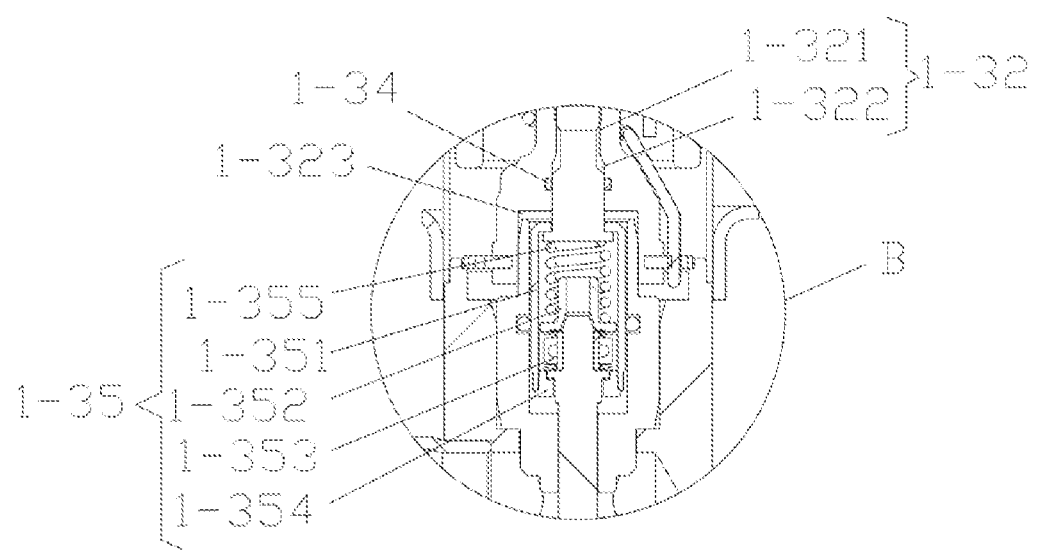
FIG. 4 shows a partial enlarged diagram at B of the electronic expansion valve provided in the second embodiment in FIG. 3.

As shown in FIGS. 3 and 4, in the technical solution of Embodiment 2, a second mounting groove is provided in the guide section 1-311 and/or the unthreaded hole section 1-322, and the second noise reduction member 1-34 is mounted in the second mounting groove. The second mounting groove may be provided in the guide section 1-311, may also be provided in the unthreaded hole section 1-322, and may also be provided in both the guide section 1-311 and the unthreaded hole section 1-322, and the second noise reduction member 1-34 is tightly pressed in the second mounting groove, such that when the lead screw 1-31 moves up and down, the second noise reduction member 1-34 does not move to a position where the external thread section 1-312 matches the internal thread section 1-321, and if the second noise reduction member 1-34 moves to the position where the external thread section 1-312 matches the internal thread section 1-321, the lead screw 1-31 will stuck, and the electronic expansion valve fails. As shown in FIG. 3, the lead screw 1-31 includes a fixed section 1-313, the nut seat 1-32 includes a smooth section, the smooth section is located on one side, away from the actuator 20, of the internal thread section 1-321, the fixed section 1-313 at least partially penetrates in the smooth section, the smooth section and the fixed section 1-313 are in clearance fit, and certainly, in order to reduce noise produced by clearance fit between the lead screw 1-31 and the nut seat 1-32, a second mounting groove may also be provided in the fixed section 1-313 and/or the smooth section, and the second noise reduction member 1-34 is mounted in the second mounting groove. The second mounting groove is generally an annular groove which is easy to machine, and the second mounting groove may also be machined into a groove with other shapes, for example, a spiral shape. The second mounting groove limits an axial movement of the second noise reduction member 1-34, and when the lead screw 1-31 moves up and down, the second noise reduction member 1-34 does not move freely.

As shown in FIG. 3, in the technical solution of Embodiment 2, the second noise reduction member 1-34 includes an elastic O-ring or a piston cup, and the second noise reduction member 1-34 is in interference fit in the horizontal direction. The second noise reduction member 1-34 is tightly pressed between the fixed section 1-313 and the unthreaded hole section 1-322, such that the lead screw 1-31 operates more stably in the nut seat 1-32, so as to reduce collision and noise. The O-ring and piston cup are readily available, do not require separate design and machining, and are inexpensive. Certainly, the second noise reduction member 1-34 may also be of other shapes, but the shape of the second noise reduction member 1-34 needs to match the shape of the second mounting groove, and friction caused by the second noise reduction member 1-34 may not be too large, which needs to guarantee that the lead screw 1-31 may move smoothly. The second noise reduction member 1-34 is made of rubber generally, and the rubber is low in price and has certain elasticity, so the second noise reduction member 1-34 is tightly clamped between the fixed section 1-313 and the unthreaded hole section 1-322 without damaging the fixed section 1-313 and the unthreaded hole section 1-322.

As shown in FIG. 4, in the technical solution of Embodiment 2, the nut seat 1-32 further includes an open groove 1-323, the open groove 1-323 is in communication with the unthreaded hole section 1-322, and an inner diameter of the open groove 1-323 is larger than that of the unthreaded hole section 1-322, and the guide sleeve 1-40 is at least partially clamped in the open groove 1-323. A shape and a size of the open groove 1-323 match those of the guide sleeve 1-40. The guide sleeve 1-40 is clamped between the nut seat 1-32 and the valve seat 10.

The difference between the technical solution of Embodiment 3 and the technical solution of Embodiment 1 lies in that in the technical solution of Embodiment 3 (not shown in the figure), no first noise reduction member 1-33 is arranged, and the outer wall of the connection sleeve assembly 1-35 and the inner wall of the first channel are provided with no first mounting groove.

Figure 6:
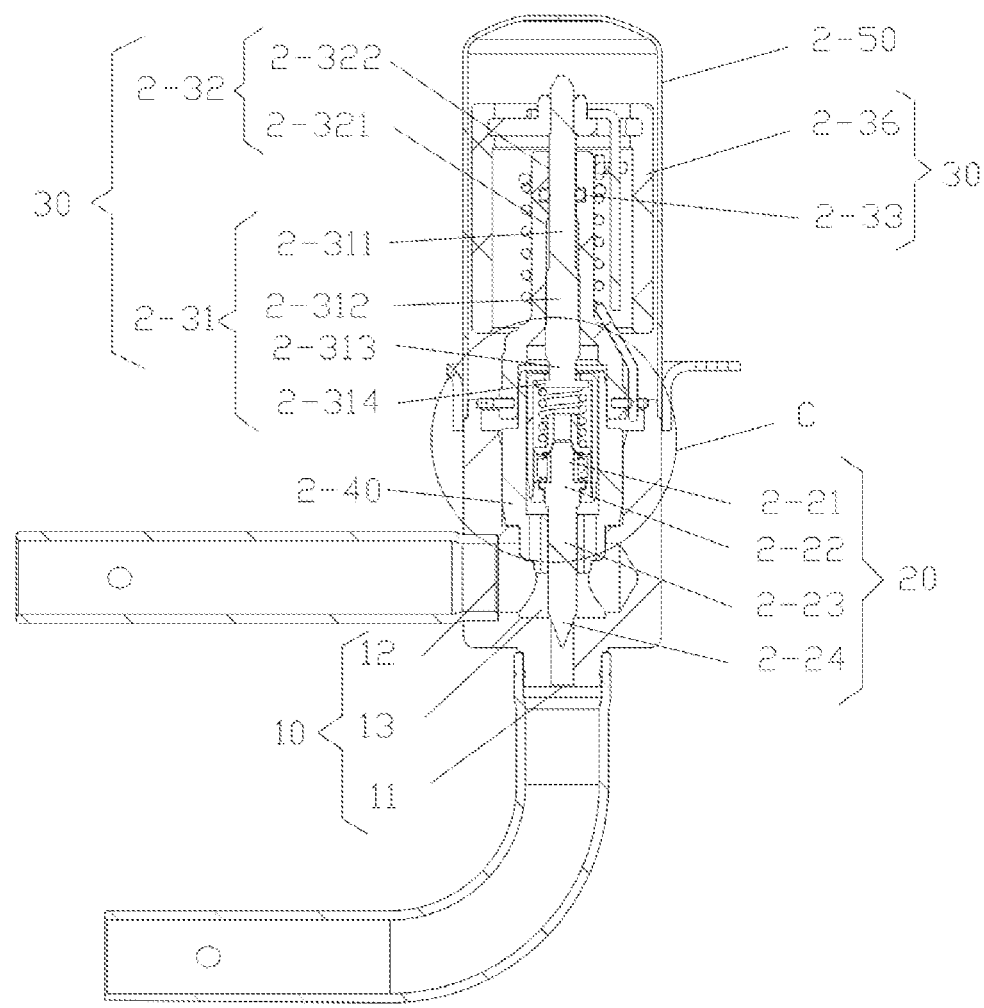
FIG. 6 shows a schematic cross sectional view of a front view of an electronic expansion valve provided in a fourth embodiment according to the present disclosure.
Figure 9:
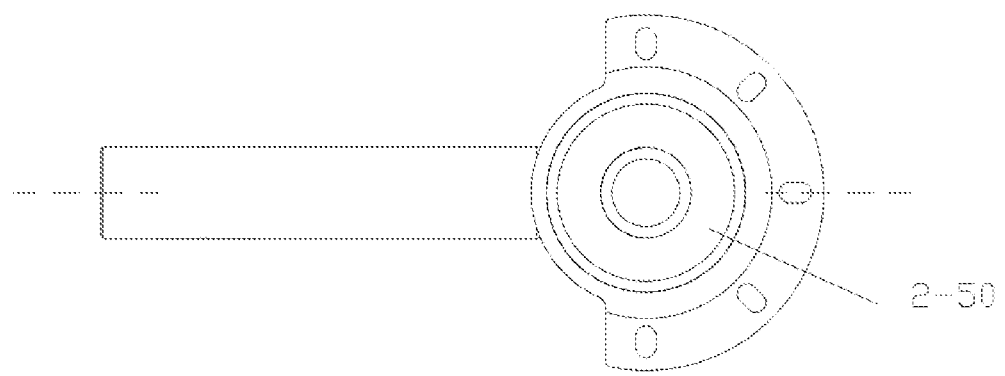
FIG. 9 shows a top view of the electronic expansion valve provided of the fourth embodiment in FIG. 6.

As shown in FIGS. 6 and 9, an electronic expansion valve of Embodiment 4 includes: a valve seat 10, an actuator 20 and a driving mechanism 30, where the valve seat 10 is provided with an inlet 11, an outlet 12 and a communication channel 13 in communication with the inlet 11 and the outlet 12; the actuator 20 is movably mounted in the valve seat 10, the actuator 20 is provided with a first position to block the communication channel 13 and a second position to avoid the communication channel 13; the driving mechanism 30 is connected to the actuator 20 to drive the actuator 20 to move between the first position and the second position; and the driving mechanism 30 further includes a lead screw 2-31, a nut seat 2-32 and a third noise reduction member 2-33, the lead screw 2-31 penetrates into the nut seat 2-32, and the third noise reduction member 2-33 is arranged between the lead screw 2-31 and the nut seat 2-32.

According to the technical solution of Embodiment 4, the electronic expansion valve includes the valve seat 10, the actuator 20 and the driving mechanism 30, where the valve seat 10 includes the inlet 11, the outlet 12 and the communication channel 13 in communication with the inlet 11 and the outlet 12, and the driving mechanism 30 is connected with the actuator 20, so as to move the actuator 20 up and down. Fluid enters the electronic expansion valve from the inlet 11, and the driving mechanism 30 drives the actuator 20 to block or avoid the communication channel 13 to different degrees, so as to close or open the electronic expansion valve to different degrees. The driving mechanism 30 includes the lead screw 2-31 and the nut seat 2-32, the lead screw 2-31 is in clearance fit with the nut seat 2-32, and a third noise reduction member 2-33 is arranged between the lead screw 2-31 and the nut seat 2-32, such that the lead screw 2-31 operates more stably, so as to reduce noise. The technical solution of Embodiment 4 effectively solves the problem that an electronic expansion valve produces high noise due to clearance fit between a nut seat and a lead screw in the art known to some inventors.

As shown in FIG. 6, in the technical solution of Embodiment 4, the lead screw 2-31 includes a fixed section 2-311 and an external thread section 2-312, and the nut seat 2-32 includes an internal thread section 2-321 and an unthreaded hole section 2-322, the external thread section 2-312 cooperates with the internal thread section 2-321, the fixed section 2-311 is arranged corresponding to the unthreaded hole section 2-322, and the third noise reduction member 2-33 is located between the fixed section 2-311 and the unthreaded hole section 2-322. The electronic expansion valve further includes a housing 2-50, where the housing 2-50 and the valve seat 10 are welded together, a rotor 2-36 is arranged in the housing 2-50, the rotor 2-36 includes a permanent magnet, the rotor 2-36 is fixedly connected with the lead screw 2-31, the nut seat 2-32 is fixed to the valve seat 10, a coil is wound around the housing 2-50, and magnetic attraction or repulsion is generated between a magnetic pole of the rotor 2-36 and a magnetic pole generated by induction of the coil, such that the rotor 2-36 rotates, so as to drive the lead screw 2-31 to rotate, since the lead screw 2-31 is in threaded connection to the nut seat 2-32, the lead screw 2-31 moves up and down while rotating, so as to drive the actuator 20 to move up and down, and the rotor 2-36 also moves up and down while the lead screw 2-31 moves up and down. The third noise reduction member 2-33 is in interference fit with the fixed section 2-311 of the lead screw 2-31, and the third noise reduction member 2-33 is arranged between the fixed section 2-311 and the unthreaded hole section 2-322, such that the lead screw 2-31 operates more stably, so as to reduce noise generated during operating of the lead screw 2-31 and the rotor 2-36.

As shown in FIG. 6, in the technical solution of Embodiment 4, the fixed section 2-311 is located on one side, away from the actuator 20, of the external thread section 2-312. The fixed section 2-311 is connected with the rotor 2-36, the external thread section 2-312 matches the internal thread section 2-321, so as to move the lead screw 2-31 up and down, and then the lead screw 2-31 drives the actuator 20 to move. The nut seat 2-32 further includes an open groove 2-323, the open groove 2-323 is connected with the internal thread section 2-321, an upper portion of the connection sleeve assembly 2-35 is clamped in the open groove 2-323, a diameter of the open groove 2-323 is larger than that of the internal thread section 2-321, and when the lead screw 2-31 descends, a lower portion of the external thread section 2-312 of the lead screw 2-31 enters the open groove 2-323 and moves up and down in the open groove 2-323.

As shown in FIG. 6, in the technical solution of Embodiment 4, a first mounting portion is arranged on the fixed section 2-311 and/or the unthreaded hole section 2-322, and the third noise reduction member 2-33 is at least partially mounted in the first mounting portion. The first mounting portion may be provided in the fixed section 2-311, may also be provided in the unthreaded hole section 2-322, and may also be provided in both the fixed section 2-311 and the unthreaded hole section 2-322, and the third noise reduction member 2-33 is in interference fit with the first mounting portion and tightly pressed between the first mounting portion and the lead screw 2-31, such that when the lead screw 2-31 moves up and down, the third noise reduction member 2-33 does not move to a position where the external thread section 2-312 matches the internal thread section 2-321, and under the condition that the third noise reduction member 2-33 moves to the position where the external thread section 2-312 matches the internal thread section 2-321, the lead screw 2-31 is stuck, and the electronic expansion valve fails.

As shown in FIG. 6, in the technical solution of Embodiment 4, the first mounting portion includes an annular groove. The annular groove is easy to machine, and the first mounting portion may also be machined into a groove with other shapes, for example, a spiral shape.

As shown in FIG. 6, in the technical solution of Embodiment 4, the third noise reduction member 2-33 includes an elastic O-ring or a piston cup. The O-ring and piston cup are readily available and do not require separate design and machining. Certainly, the third noise reduction member 2-33 may also be of other shapes, but the shape of the third noise reduction member 2-33 needs to match the shape of the first mounting portion, and friction caused by the third noise reduction member 2-33 may not be too large, which needs to guarantee that the lead screw 2-31 may move smoothly. In some embodiments, the third noise reduction member 2-33 is made of rubber, and the rubber is low in price and has certain elasticity, so the third noise reduction member 2-33 is tightly clamped between the lead screw 1-31 and the first mounting portion 2-322 without damaging the lead screw 2-31 and the nut seat 1-32.

Figure 7:
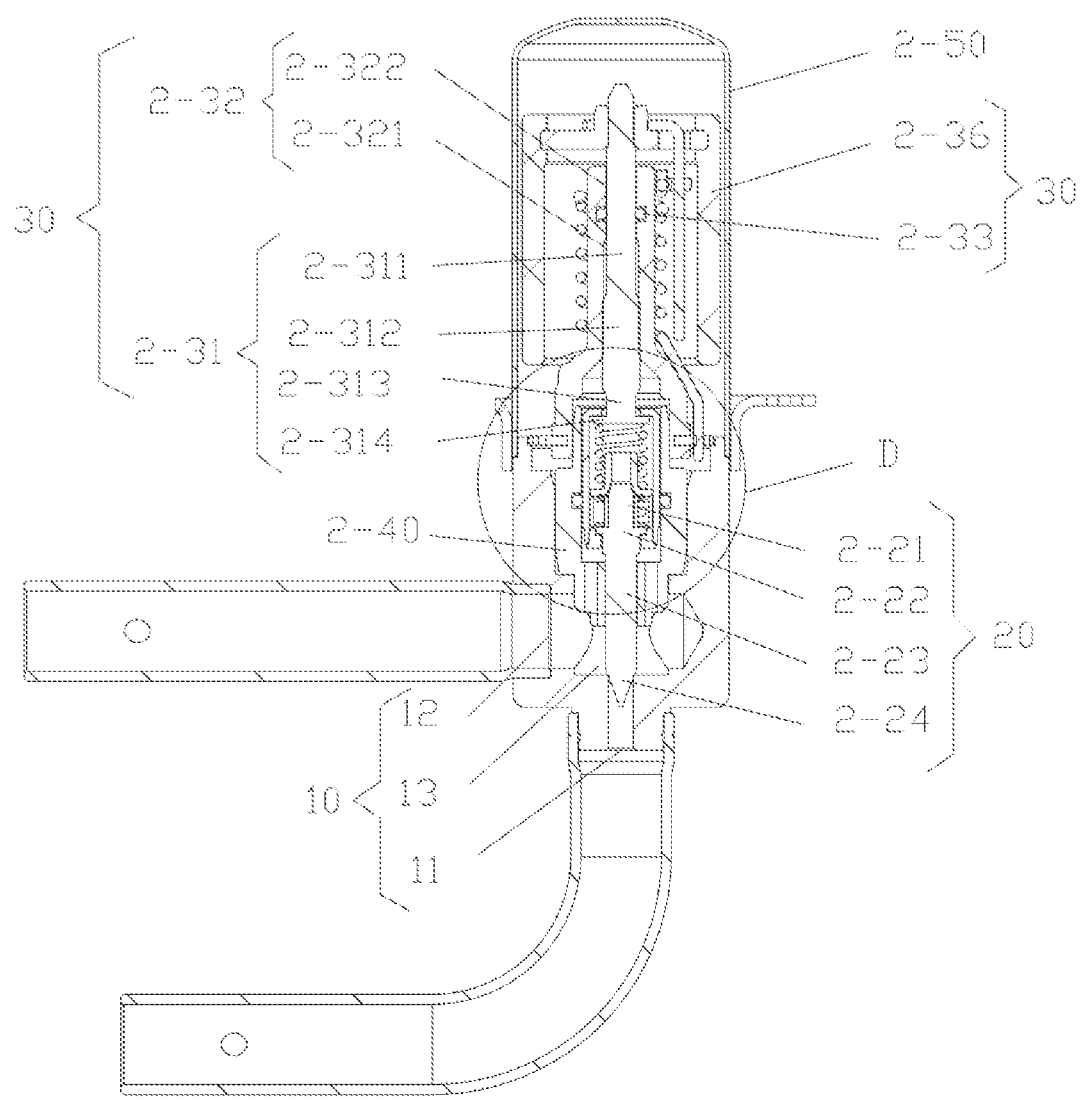
FIG. 7 shows a schematic cross sectional view of a front view of an electronic expansion valve provided in a fifth embodiment according to the present disclosure.
Figure 8:
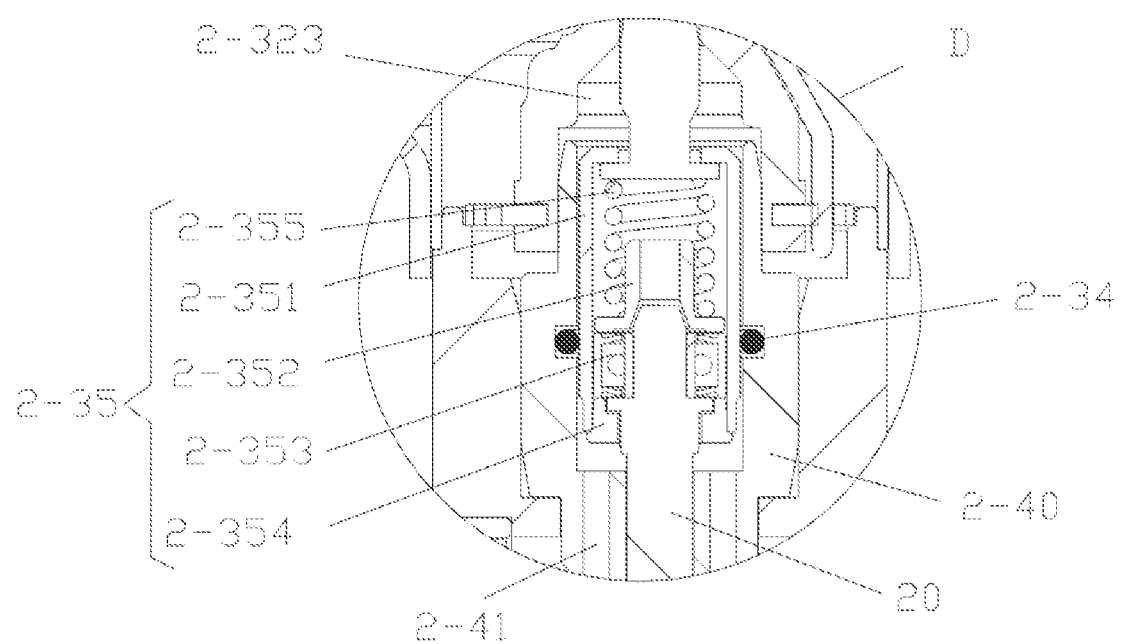
FIG. 8 shows a partial enlarged diagram at D of the electronic expansion valve provided in the fifth embodiment in FIG. 7.

As shown in FIGS. 7 and 8, the difference between the technical solution of Embodiment 5 and the technical solution of Embodiment 4 lies in that the driving mechanism 30 further includes a guide sleeve 2-40, a connection sleeve assembly 2-35 and a fourth noise reduction member 2-34, the guide sleeve 2-40 is located in the valve seat 10, and the connection sleeve assembly 2-35 is at least partially located in the guide sleeve 2-40, and the lead screw 2-31 is connected with the actuator 20 by the connection sleeve assembly 2-35. The guide sleeve 2-40 includes a first channel and a second channel, a balance hole 2-41 is further provided in a circumferential outer side of the second channel and in communication with the first channel and the communication channel 13 of the valve seat 10, so as to balance upper pressure and lower pressure of the guide sleeve 2-40. The connection sleeve assembly 2-35 may move in the first channel, the first channel is in clearance fit with the connection sleeve assembly 2-35, the connection sleeve assembly 2-35 includes a spring sleeve 2-351, a gasket 2-352, a bearing 2-353, a pressing sleeve 2-354 and a spring 2-355, the actuator 20 is a valve needle, the valve needle includes a fixing portion 2-21, a limiting portion 2-22, a guide portion 2-23 and a throttling portion 2-24, the lead screw 2-31 further includes a guide section 2-313 and a limiting section 2-314, a first end of the spring 2-355 abuts against the limiting section 2-314 of the lead screw 2-31, a second end of the spring 2-355 abuts against the gasket 2-352, and the fixing portion 2-21 of the valve needle is connected with the gasket 2-352. The spring sleeve 2-351 sleeves on an outer side of the spring 2-355, a via hole is provided in an upper end of the spring sleeve 2-351, the guide section 2-313 of the lead screw 2-31 passes through the via hole, a diameter of the limiting portion 2-22 of the valve needle is larger than that of the fixing portion 2-21, the bearing 2-353 is arranged between the limiting portion 2-22 and the gasket 2-352, and the bearing 2-353 may prevent the valve needle from rotating when the valve needle blocks the communication channel 13 to different degrees to throttle, and it is guaranteed that the valve needle only moves up and down and does not rotate during throttling, so as to prevent the communication channel 13 and the throttling portion 2-24 from being worn. The pressing sleeve 2-354 is arranged at a lower end of the spring sleeve 2-351. A through hole is provided in a middle of the pressing sleeve 2-354, the guide portion 2-23 of the valve needle passes out of the through hole and is located in the second channel of the guide sleeve 2-40, the pressing sleeve 2-354 limits the limiting portion 2-22 of the valve needle in the spring sleeve 2-351, an axial gap is defined between the limiting portion 2-22 of the valve needle and the pressing sleeve 2-354, and when the valve needle is located at the position for blocking the communication channel 13, the throttling portion 2-24 makes contact with the communication channel 13, and the valve needle does not rotate. The guide portion 2-23 of the valve needle is also in clearance fit with the second channel, and the guide portion 2-23 may move in the second channel.

As shown in FIGS. 7 and 8, in the technical solution of Embodiment 5, the fourth noise reduction member 2-34 is arranged between the guide sleeve 2-40 and the connection sleeve assembly 2-35. In some embodiments, the fourth noise reduction member 2-34 is arranged between the spring sleeve 2-351 and the guide sleeve 2-40, the fourth noise reduction member 2-34 is in interference fit with the spring sleeve 2-351, so as to make the spring sleeve 2-351 move more stably, and match the third noise reduction member 2-33 arranged between the lead screw 2-31 and the nut seat 2-32, to further reduce noise.

As shown in FIG. 8, in the technical solution of Embodiment 5, a second mounting portion is provided on an outer wall of the connection sleeve assembly 2-35 and/or an inner wall of the guide sleeve 2-40, and the fourth noise reduction member 2-34 is at least partially mounted in the second mounting portion. The second mounting portion may be arranged on an outer wall of the spring sleeve 2-351 or on an inner wall of the first channel of the guide sleeve 2-40, or, certainly, on both the outer wall of the spring sleeve 2-351 and the inner wall of the guide sleeve 2-40. The fourth noise reduction member 2-34 is in interference fit with the second mounting portion, and the fourth noise reduction member 2-34 is tightly pressed between the second mounting portion and the spring sleeve 2-351, such that when the spring sleeve 2-351 moves up and down, the fourth noise reduction member 2-34 does not move freely.

As shown in FIG. 8, in the technical solution of Embodiment 5, the second mounting portion includes an annular groove, and the fourth noise reduction member 2-34 includes an O-ring or a piston cup. The annular groove is easy to machine, and the second mounting portion may also be machined into a groove with other shapes, for example, a spiral shape. The O-ring and piston cup are readily available, do not require separate design and machining, and are inexpensive. Certainly, the fourth noise reduction member 2-34 may also be of other shapes, but the shape of the fourth noise reduction member 2-34 needs to match the shape of the second mounting portion, and friction caused by the fourth noise reduction member 2-34 may not be too large, which needs to guarantee that the spring sleeve 2-351 may move smoothly. In some embodiments, the fourth noise reduction member 2-34 is made of rubber, and the rubber is low in price and has certain elasticity, so the fourth noise reduction member 2-34 is tightly clamped between the spring sleeve 2-351 and the second mounting portion without damaging the spring sleeve 2-351 and the guide sleeve 2-40.

Figure 10:
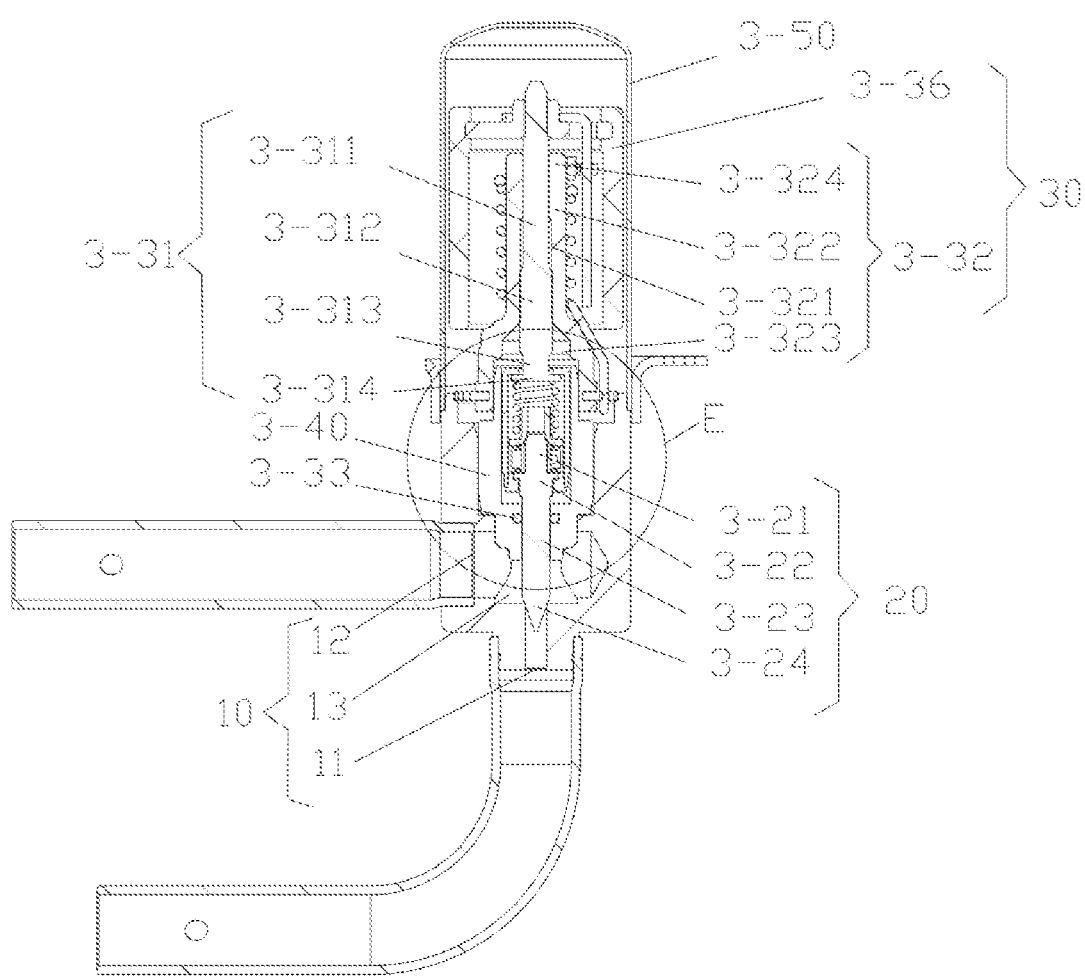
FIG. 10 shows a schematic cross sectional view of an electronic expansion valve provided in a sixth embodiment according to the present disclosure.
Figure 11:
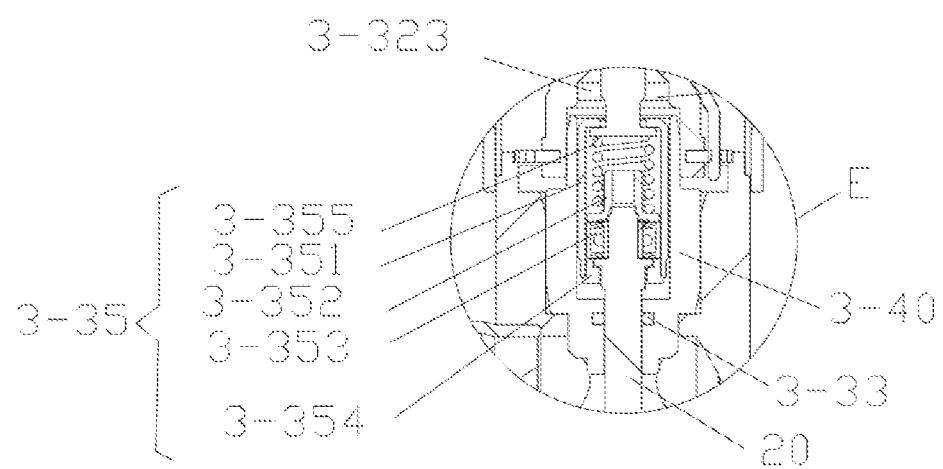
FIG. 11 shows a partial enlarged diagram at E of the electronic expansion valve provided of the sixth embodiment in FIG. 10.
Figure 16:
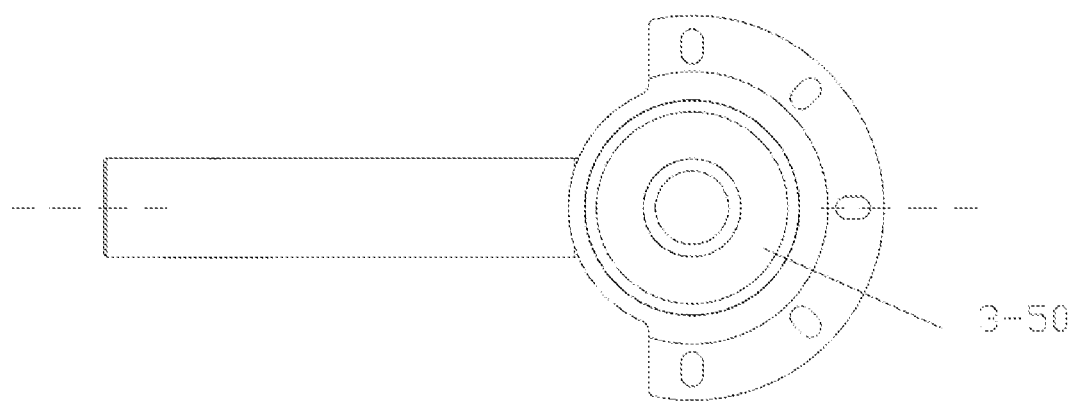
FIG. 16 shows a top view of the electronic expansion valve provided of the sixth embodiment.
Figure 17:
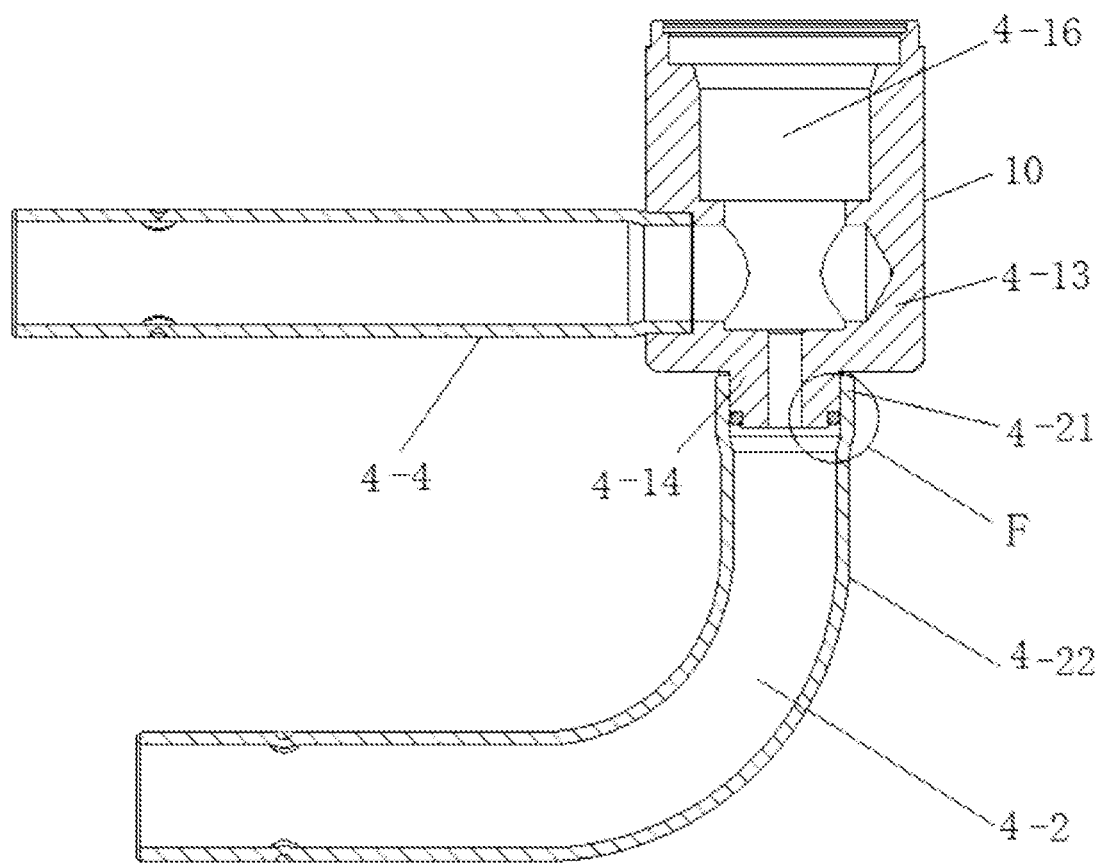
FIG. 17 shows a schematic diagram of a valve seat assembly of an electronic expansion valve provided in a thirteenth embodiment according to the present disclosure.
Figure 18:
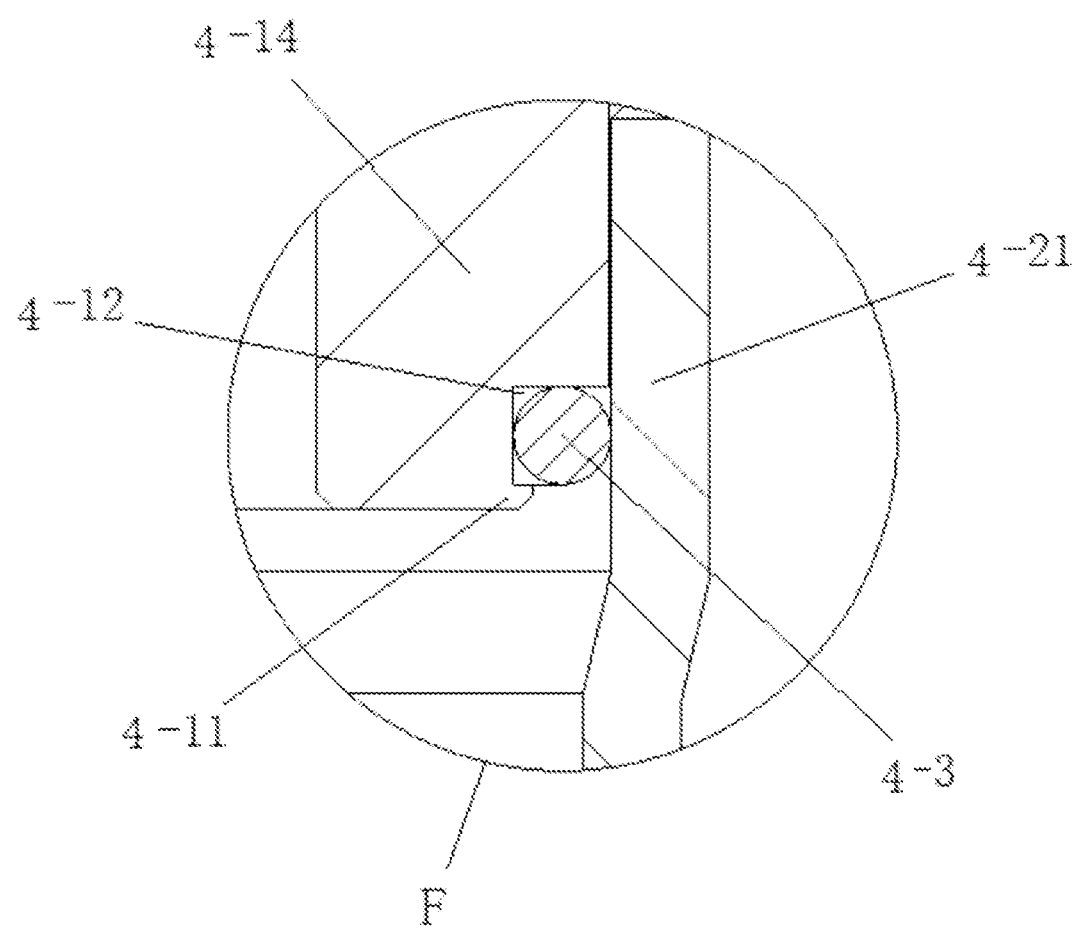
FIG. 18 shows an enlarged diagram of area F in FIG. 17.
Figure 19:
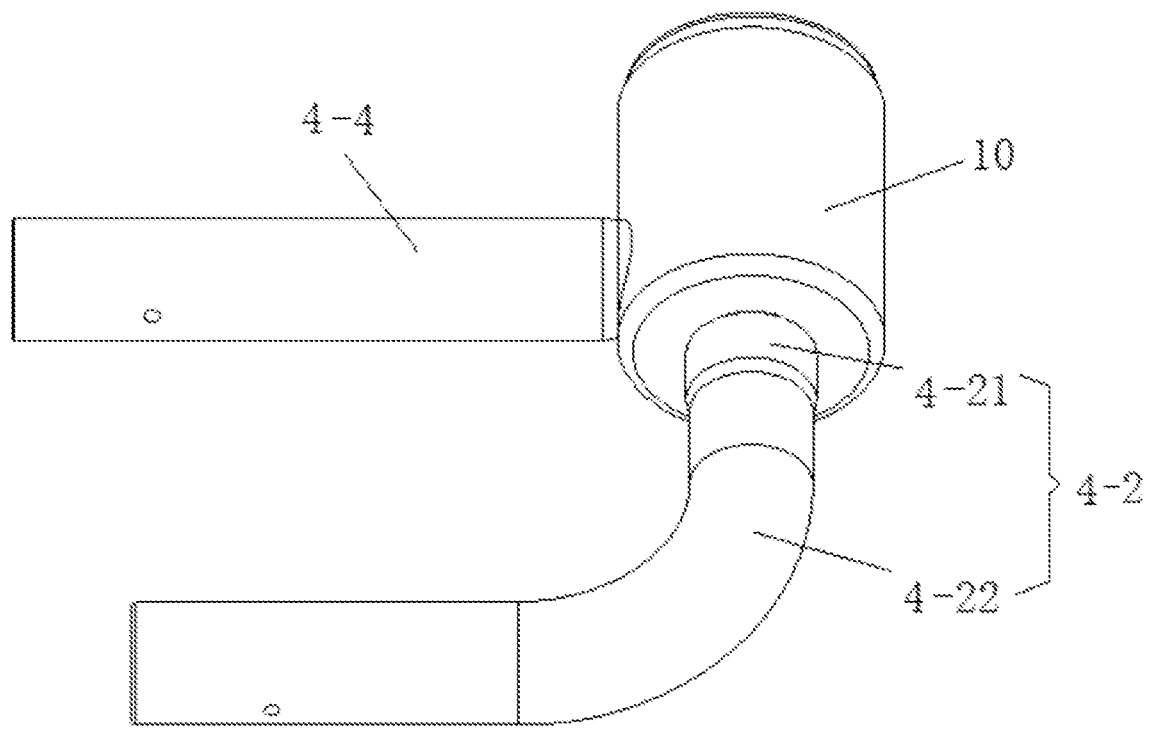
FIG. 19 shows a three-dimensional picture of a valve seat assembly of an electronic expansion valve in FIG. 17.
Figure 20:
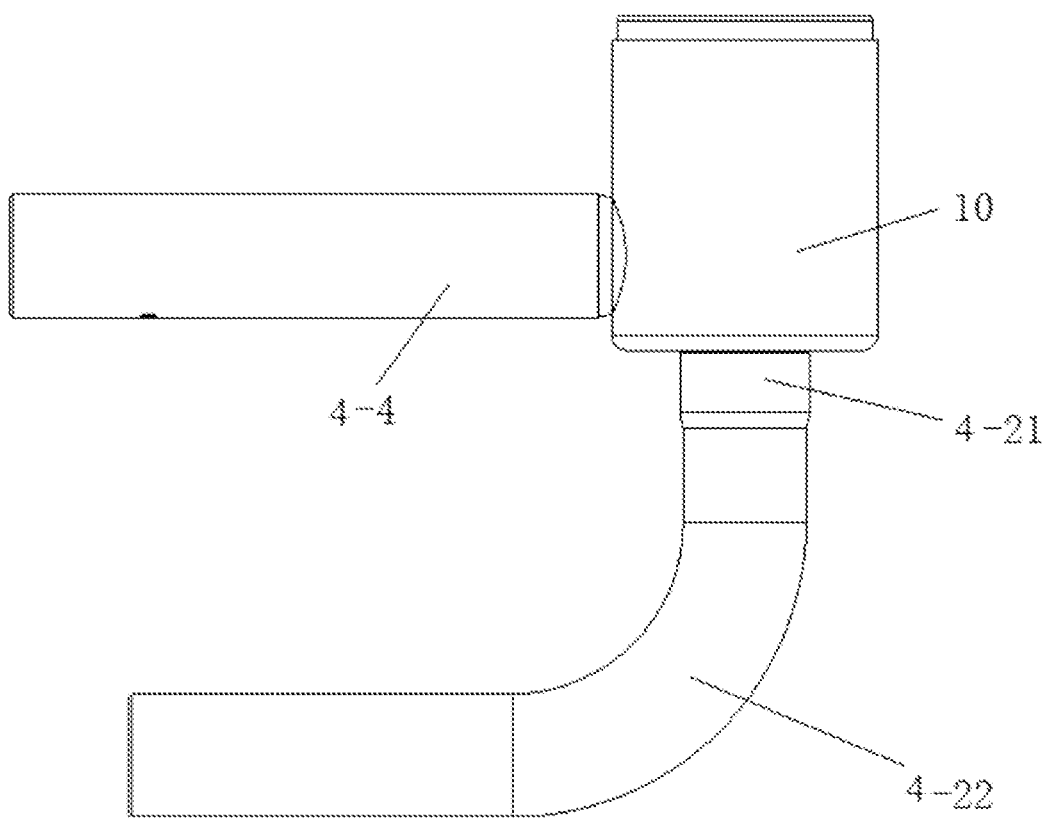
FIG. 20 shows a front view of a valve seat assembly of an electronic expansion valve in FIG. 17.
Figure 21:
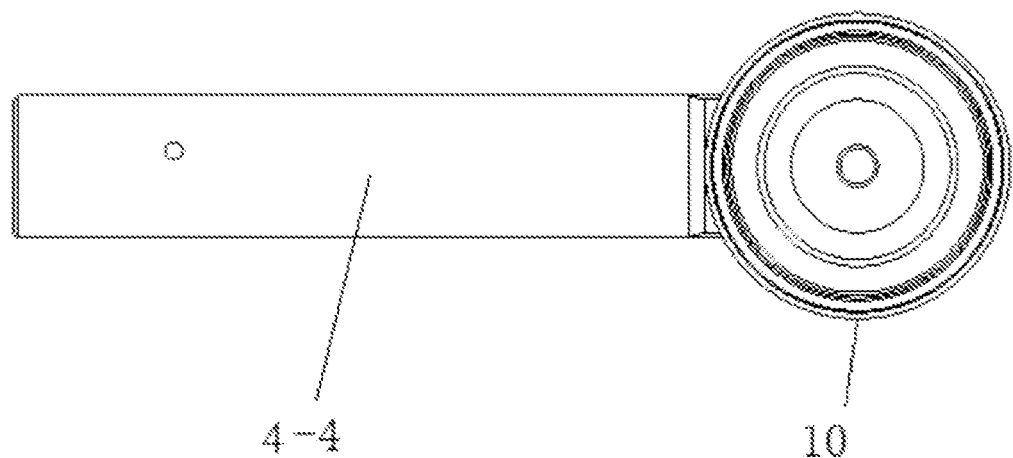
FIG. 21 shows a top view of a valve seat assembly of an electronic expansion valve in FIG. 17.
Figure 22:
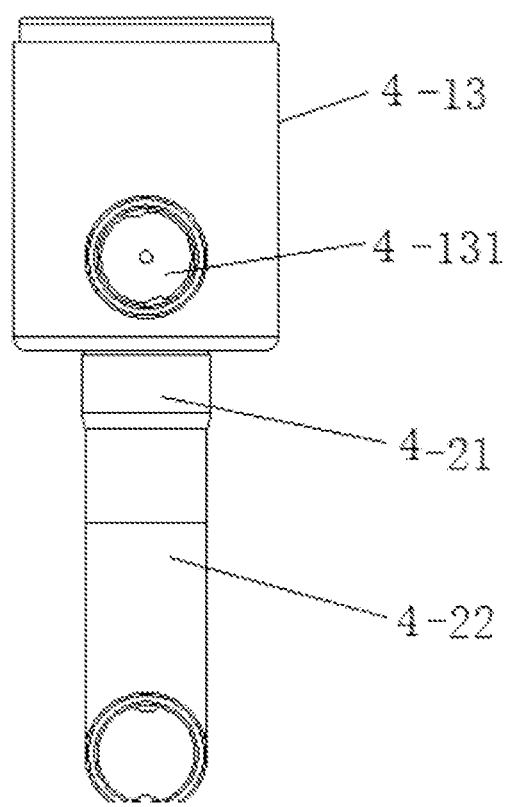
FIG. 22 shows a side view of a valve seat assembly of an electronic expansion valve in FIG. 17.

As shown in FIGS. 10, 11 and 16, an electronic expansion valve of Embodiment 6 includes: a valve seat 10, an actuator 20, a driving mechanism 30, a guide sleeve 3-40 and a fifth noise reduction member 3-33, where the valve seat 10 is provided with an inlet 11, an outlet 12 and a communication channel 13 in communication with the inlet 11 and the outlet 12; the actuator 20 is movably mounted in the valve seat 10; the driving mechanism 30 is connected to the actuator 20; and the guide sleeve 3-40 is located in the valve seat 10, the actuator 20 is at least partially arranged in the guide sleeve 3-40, and the fifth noise reduction member 3-33 is arranged between the guide sleeve 3-40 and the actuator 20.

According to the technical solution of embodiment 6, the electronic expansion valve includes the valve seat, the actuator and the driving mechanism, where the valve seat includes the inlet, the outlet and the communication channel in communication with the inlet and the outlet, and the driving mechanism is connected with the actuator so as to move the actuator up and down. Fluid enters the electronic expansion valve from the inlet, and the driving mechanism drives the actuator to block the communication channel or avoid the communication channel to different degrees, so as to close the electronic expansion valve or open the electronic expansion valve to different degrees. The driving mechanism 30 includes the guide sleeve, the actuator is at least partially arranged in the guide sleeve, the actuator is in clearance fit with the guide sleeve, and a fifth noise reduction member is arranged between the guide sleeve and the actuator, such that the actuator operates more stably, so as to reduce collision and noise. The technical solution of Embodiment 6 effectively solves the problem that in an electronic expansion valve in the art known to inventors, noise is produced between the actuator and the guide sleeve due to clearance fit between the actuator and the guide sleeve during action of the actuator As shown in FIGS. 10 and 11, in the technical solution of Embodiment 6, the driving mechanism 30 further includes a rotor 3-36, a lead screw 3-31, a nut seat 3-32 and a connection sleeve assembly 3-35, the rotor 3-36 is connected with the lead screw 3-31, the lead screw 3-31 penetrates into the nut seat 3-32, the connection sleeve assembly 3-35 is located in the guide sleeve 3-40, and the lead screw 3-31 is connected with the actuator 20 by the connection sleeve assembly 3-35. The connection sleeve assembly 3-35 includes a spring sleeve 3-351, a gasket 3-352, a bearing 3-353, a pressing sleeve 3-354 and a spring 3-355, the actuator 20 is a valve needle, the valve needle includes a fixing portion 3-21, a limiting portion 3-22, a guide portion 3-23 and a throttling portion 3-24, the lead screw 3-31 further includes a guide section 3-313 and a limiting section 3-314, a first end of the spring 3-355 abuts against the limiting section 3-314 of the lead screw 3-31, a second end of the spring 3-355 abuts against the gasket 3-352, and the fixing portion 3-21 of the valve needle is connected with the gasket 2-352. The spring sleeve 3-351 sleeves on an outer side of the spring 3-355, a via hole is provided in an upper end of the spring sleeve 3-351, the guide section 3-313 of the lead screw 3-31 passes through the via hole, a diameter of the limiting portion 3-22 of the valve needle is larger than that of the fixing portion 3-21, the bearing 3-353 is arranged between the limiting portion 3-22 and the gasket 3-352, and the bearing 3-353 may prevent relative rotation when the throttling portion 3-24 makes contact with the communication channel 13, so as to prevent the communication channel 13 and the throttling portion 3-24 from being abraded. The pressing sleeve 3-354 is arranged at a lower end of the spring sleeve 3-351. A through hole is provided in a middle of the pressing sleeve 3-354, the guide portion 3-23 of the valve needle penetrates out of the through hole and is located in the second channel of the guide sleeve 3-40, the pressing sleeve 3-354 limits the limiting portion 3-22 of the valve needle in the spring sleeve 3-351, an axial gap is defined between the limiting portion 3-22 of the valve needle and the pressing sleeve 3-354, and when the valve needle is located at the position for blocking the communication channel 13, the valve needle may not rotate. The throttling portion 3-24 of the valve needle matches the communication channel 13 of the valve seat 10, the connection sleeve assembly 3-35 drives the valve needle to move upwards, the throttling portion 3-24 avoids the communication channel 13, the fluid passes through the electronic expansion valve, the connection sleeve assembly 3-35 drives the valve needle to move downwards, the throttling portion 3-24 blocks the communication channel 13, a diameter of the throttling portion 3-24 is gradually increased from one end close to the communication channel 13 to one end far away from the communication channel 13, and when the throttling portion 3-24 blocks the communication channel 13, under the condition that the diameter, matching the communication channel 13, of the throttling portion 3-24 is different, a flow area of the communication channel 13 is different.

As shown in FIG. 10, in the technical solution of Embodiment 6, the guide sleeve 3-40 includes a first channel and a second channel which are in communication and coaxial, the first channel is located on one side, away from the inlet 11, of the second channel, and the second channel is in communication with the communication channel 13 of the valve seat 10, the connection sleeve assembly 3-35 is arranged in the first channel, the actuator 20 is at least partially arranged in the second channel, and the fifth noise reduction member 3-33 is arranged between a wall surface of the second channel and the actuator 20. The connection sleeve assembly 3-35 is movable in the first channel, the actuator 20 is movable in the second channel, the actuator 20 is in clearance fit with the second channel, the fifth noise reduction member 3-33 is in interference fit in the horizontal direction, and the fifth noise reduction member 3-33 is tightly pressed between the second channel and the actuator 20, such that the actuator 20 operates more stably in the second channel, so as to reduce collision and noise.

As shown in FIGS. 10 and 11, in the technical solution of Embodiment 6, a first mounting groove is provided in an outer wall of the actuator 20 and/or the wall surface of the second channel, and the fifth noise reduction member 3-33 is at least partially mounted in the first mounting groove. Specifically, the first mounting groove is provided in the outer wall of the guide portion 3-23 of the actuator 20, or the first mounting groove is provided in the wall surface of the second channel, or the first mounting groove is provided in both the outer wall of the guide portion 3-23 and the wall surface of the second channel, the first mounting groove is generally an annular groove which is easy to machine, and the second mounting portion may also be machined into a groove with other shapes, for example, a spiral shape. The first mounting groove limits an axial movement of the fifth noise reduction member 3-33, and when the spring sleeve 3-351 moves up and down, the fifth noise reduction member 3-33 may not move freely. The fifth noise reduction member 3-33 includes an elastic O-ring or a piston cup, and the O-ring and piston cup are readily available, do not require separate design and machining, and are inexpensive. Certainly, the fifth noise reduction member 3-33 may also be of other shapes, but the shape of the fifth noise reduction member 3-33 needs to match the shape of the first mounting groove, and friction caused by the fifth noise reduction member 3-33 may not be too large, which needs to guarantee that the spring sleeve 3-351 may move smoothly. The fifth noise reduction member 3-33 is made of rubber generally, and the rubber is low in price and has certain elasticity, so the fifth noise reduction member 3-33 may be tightly clamped between the guide sleeve 3-40 and the actuator 20 without damaging the actuator 20 and the guide sleeve 3-40.

Figure 13:
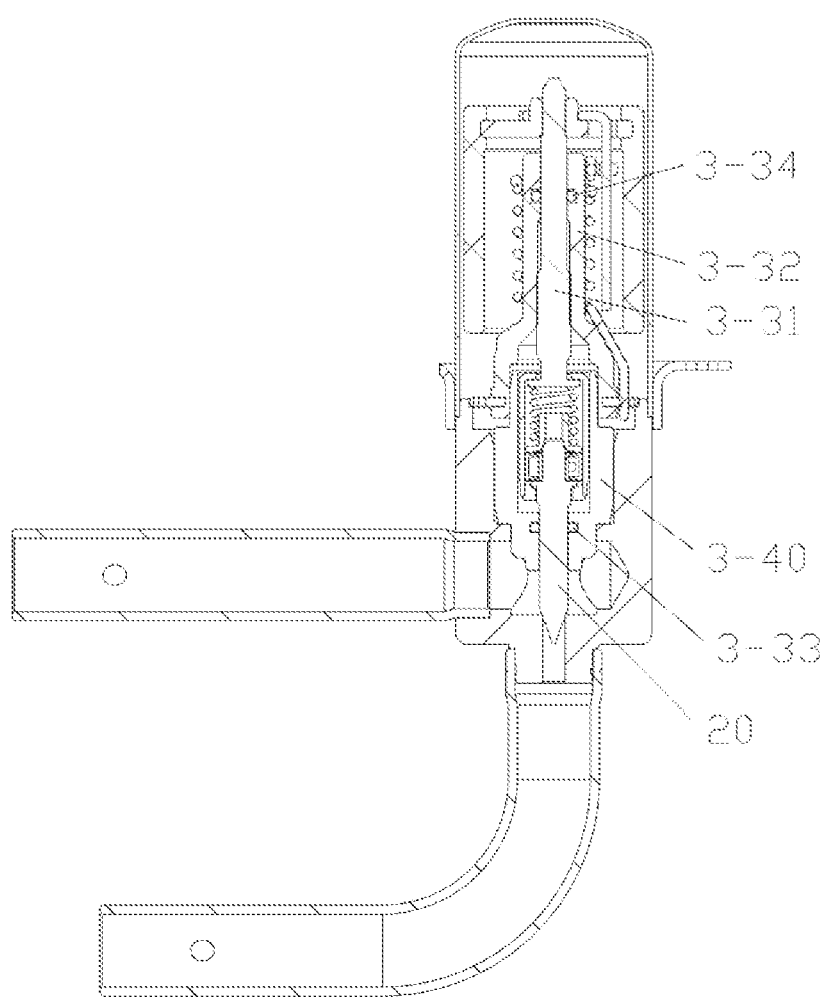
FIG. 13 shows a schematic cross sectional view of an electronic expansion valve provided in a seventh embodiment according to the present disclosure.

As shown in FIG. 13, the difference between the technical solution of Embodiment 7 and the technical solution of Embodiment 6 lies in that the driving mechanism 30 further includes a sixth noise reduction member 3-34, the sixth noise reduction member 3-34 is arranged between the lead screw 3-31 and the nut seat 3-32. The electronic expansion valve further includes a housing 3-50, where the housing 3-50 and the valve seat 10 are welded together, a rotor 3-36 is arranged in the housing 3-50, the rotor 3-36 includes a permanent magnet, the rotor 3-36 is fixedly connected with the lead screw 3-31, the nut seat 3-32 is fixed to the valve seat 10, a coil is wound around the housing 3-50, and magnetic attraction or repulsion is generated between a magnetic pole of the rotor 3-36 and a magnetic pole generated by induction of the coil, such that the rotor 3-36 rotates, so as to drive the lead screw 3-31 to rotate, since the lead screw 3-31 is in threaded connection to the nut seat 3-32, the lead screw 3-31 moves up and down while rotating, so as to drive the actuator 20 to move up and down, and the rotor 3-36 also moves up and down while the lead screw 3-31 moves up and down. The sixth noise reduction member 3-34 is arranged between the lead screw 3-31 and the nut seat 3-32, such that the lead screw 3-31 operates more stably, so as to reduce noise generated during operating of the lead screw 3-31 and the rotor 3-36.

As shown in FIG. 13, in the technical solution of Embodiment 7, the lead screw 3-31 includes a fixed section 3-311 and an external thread section 3-312, the fixed section 3-311 is located on one side, away from the actuator 20, of the external thread section 3-312, and the nut seat 3-32 includes an internal thread section 3-321 and an unthreaded hole section 3-322, the external thread section 3-312 cooperates with the internal thread section 3-321, and the fixed section 3-311 is arranged corresponding to the unthreaded hole section 3-322. The fixed section 3-311 is connected with the rotor 3-36, the external thread section 3-312 cooperates with the internal thread section 3-321, so as to move the lead screw 3-31 up and down, and then the lead screw 3-31 drives the actuator 20 to move. The nut seat 3-32 further includes an open groove 3-323, the open groove 3-323 is connected with the internal thread section 3-321, an upper portion of the connection sleeve assembly 3-35 is clamped in the open groove 3-323, a diameter of the open groove 3-323 is larger than that of the internal thread section 3-321, and when the lead screw 3-31 descends, a lower portion of the external thread section 3-312 of the lead screw 3-31 may enter the open groove 3-323 and move up and down in the open groove 3-323.

As shown in FIG. 13, in the technical solution of Embodiment 7, a second mounting groove is provided in an outer wall of the fixed section 3-311 and/or an inner wall of the unthreaded hole section 3-322, and the sixth noise reduction member 3-34 is at least partially mounted in the second mounting groove. In some embodiments, the second mounting groove is provided in the outer wall of the fixed section 3-311, or the second mounting groove is provided in the inner wall of the unthreaded hole section 3-322, or the second mounting groove is provided in both the outer wall of the fixed section 3-311 and the inner wall of the unthreaded hole section 3-322. In some embodiments, the second mounting groove is an annular groove which is easy to machine, and the second mounting groove may also be machined into a groove with other shapes, for example, a spiral shape. The second mounting groove may limit an axial movement of the sixth noise reduction member 3-34, and when the lead screw 3-31 moves up and down, the sixth noise reduction member 3-34 may not move freely. In some embodiments, the sixth noise reduction member 3-34 includes an elastic O-ring or a piston cup, and the O-ring and piston cup are readily available, do not require separate design and machining, and are inexpensive. Certainly, the sixth noise reduction member 3-34 may also be of other shapes, but the shape of the sixth noise reduction member 3-34 needs to match the shape of the second mounting groove, and friction caused by the sixth noise reduction member 3-33 may not be too large, which needs to guarantee that the spring sleeve 3-351 may move smoothly. In some embodiments, the sixth noise reduction member 3-34 is made of rubber, and the rubber is low in price and has certain elasticity, so the sixth noise reduction member 3-34 may be tightly clamped between the lead screw 3-31 and the nut seat 1-32 without damaging the lead screw 3-31 and the nut seat 1-32.

The difference between the technical solution of Embodiment 8 and the technical solution of Embodiment 6 lies in that the guide sleeve 3-40 includes a guide sleeve body 3-41 and a first pressing block 3-42, the first pressing block 3-42 is detachably fixed on the guide sleeve body 3-41, and the first pressing block 3-42 is provided with a first through hole, the actuator 20 at least partially penetrates the first through hole, and the fifth noise reduction member 3-33 is arranged between the guide sleeve body 3-41 and the first pressing block 3-42. The first through hole and the second channel are coaxially arranged and have identical inner diameter. The first pressing block 3-42 may be fixed by bonding or welding or interference fit, and may also be fixed by a bolt structure.

In the technical solution of Embodiment 8, the second channel sequentially includes a first sub-channel section, a second sub-channel section and a third sub-channel section from a position close to the inlet 11 to a position away from the inlet 11, a diameter of the first sub-channel section is larger than that of the second sub-channel section, and a diameter of the second sub-channel section is larger than that of the third sub-channel section, an outer diameter of the actuator 20 matches the third sub-channel section, the first pressing block 3-42 sequentially includes a first step section and a second step section in the direction from a position away from the inlet 11 to a position close to the inlet 11, the first step section is nested in the first sub-channel section, and the fifth noise reduction member 3-33 is arranged in a space defined by an end face of the first step section, the second channel section and the actuator 20. A space defined by the end face of the first step section, the second channel section and the actuator 20 is a first mounting groove. The fifth noise reduction member 3-33 is arranged in the first groove. The first mounting groove limits an axial movement of the fifth noise reduction member 3-33, and the fifth noise reduction member 3-33 is in interference fit in a horizontal direction, such that the fifth noise reduction member 3-33 is tightly pressed between the guide sleeve 3-40 and the actuator 20, so as to reduce collision and noise, and in some embodiments, the fifth noise reduction member 3-33 includes an elastic O-ring or a piston cup generally. The fifth noise reduction member 3-33 is mounted in the first mounting groove, and then the first pressing block 3-42 is mounted and fixed, such that the fifth noise reduction member 3-33 is assembled more easily.

The difference between the technical solution of Embodiment 9 and the technical solution of Embodiment 7 lies in that the nut seat 3-32 further includes a second pressing block 3-324, the second pressing block 3-324 is detachably arranged on one side, away from the actuator 20, of the unthreaded hole section 3-322, a second mounting groove is provided in an end face, away from the actuator 20, of the unthreaded hole section 3-322, and the sixth noise reduction member 3-34 is at least partially mounted in the second mounting groove. In some embodiments, the second mounting groove is an annular open groove coaxial with the lead screw 3-31, the second pressing block 3-324 seals an opening of the annular open groove, the second mounting groove is generally an annular groove which is easy to machine, and the second mounting groove may also be machined into a groove with other shapes, for example, a spiral shape. The second mounting groove limits an axial movement of the sixth noise reduction member 34. The sixth noise reduction member 3-34 is in interference fit in the horizontal direction, and the sixth noise reduction member 3-34 is tightly pressed between the lead screw 3-31 and the nut seat 3-32, so as to reduce collision and noise, and in some embodiments, the sixth noise reduction member 3-34 includes an elastic O-ring or a piston cup generally. The sixth noise reduction member 3-34 is mounted in the second mounting groove, and then the second pressing block 3-324 is mounted and fixed, such that the sixth noise reduction member 3-34 is assembled more easily. The second pressing block 3-324 may be fixed by interference fit with the nut seat 3-32, may also be fixed by bonding or welding, and may also be fixed by a buckle structure or a bolt structure.

Figure 14:
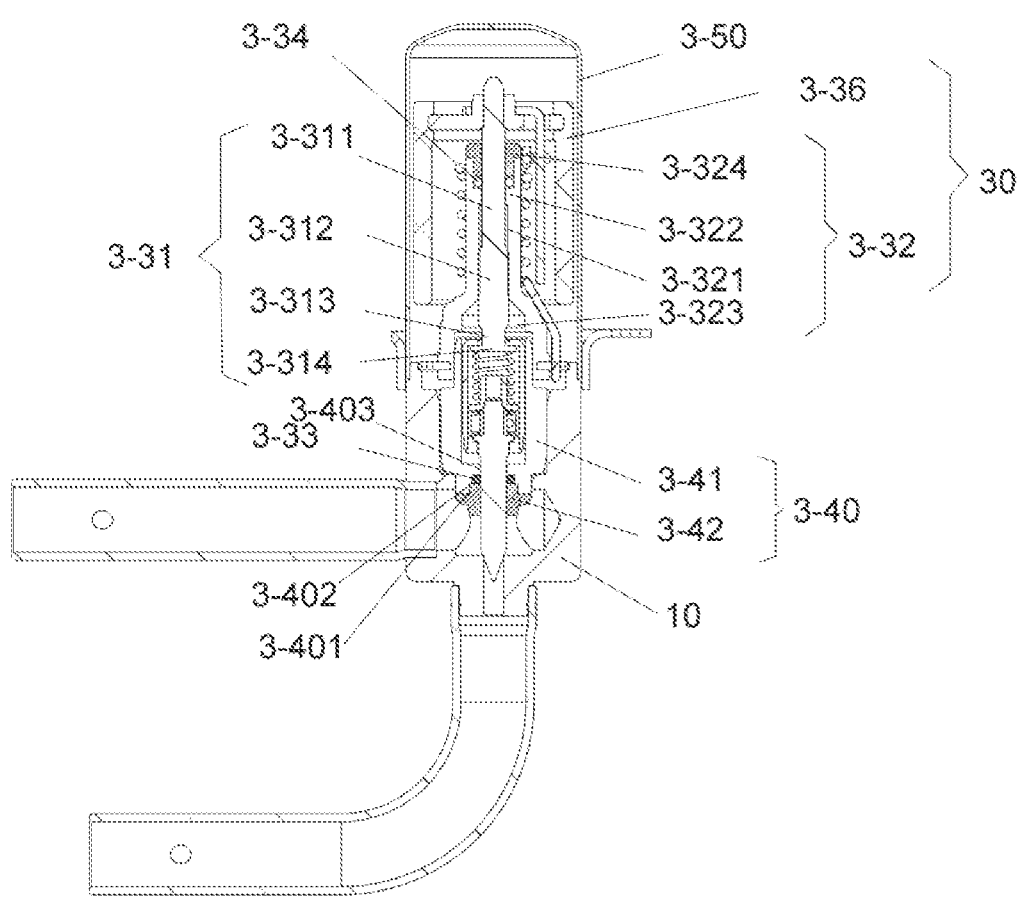
FIG. 14 shows a schematic cross sectional view of an electronic expansion valve provided in a tenth embodiment according to the present disclosure.

As shown in FIG. 14, the difference between the technical solution of Embodiment 10 and the technical solution of Embodiment 9 lies in that the second channel sequentially includes a first sub-channel section, a second sub-channel section and a third sub-channel section in a direction from a position close to the inlet 11 to a position away from the inlet 11, a diameter of the first sub-channel section is larger than that of the second sub-channel section, and a diameter of the second sub-channel section is larger than that of the third sub-channel section, an outer diameter of the actuator 20 cooperates with the third sub-channel section, the first pressing block 3-42 sequentially includes a first step section and a second step section in the direction from a position away from the inlet 11 to a position close to the inlet 11, the first step section is nested in the first sub-channel section, and the fifth noise reduction member 3-33 is arranged in a space defined by an end face of the first step section, the second channel section and the actuator 20. A space defined by the end face of the first step section, the second channel section and the actuator 20 is a first mounting groove. The fifth noise reduction member 3-33 is arranged in the first groove. The first mounting groove limits an axial movement of the fifth noise reduction member 3-33, and the fifth noise reduction member 3-33 is in interference fit in a horizontal direction, such that the fifth noise reduction member 3-33 is tightly pressed between the guide sleeve 3-40 and the actuator 20, so as to reduce collision and noise, and in some embodiments, the fifth noise reduction member 3-33 includes an elastic O-ring or a piston cup generally. The fifth noise reduction member 3-33 is mounted in the first mounting groove, and then the first pressing block 3-42 is mounted and fixed, such that the fifth noise reduction member 3-33 is assembled more easily. The first pressing block 3-42 may be fixed by bonding or welding, and may also be fixed by a buckle structure or a bolt structure.

Figure 12:
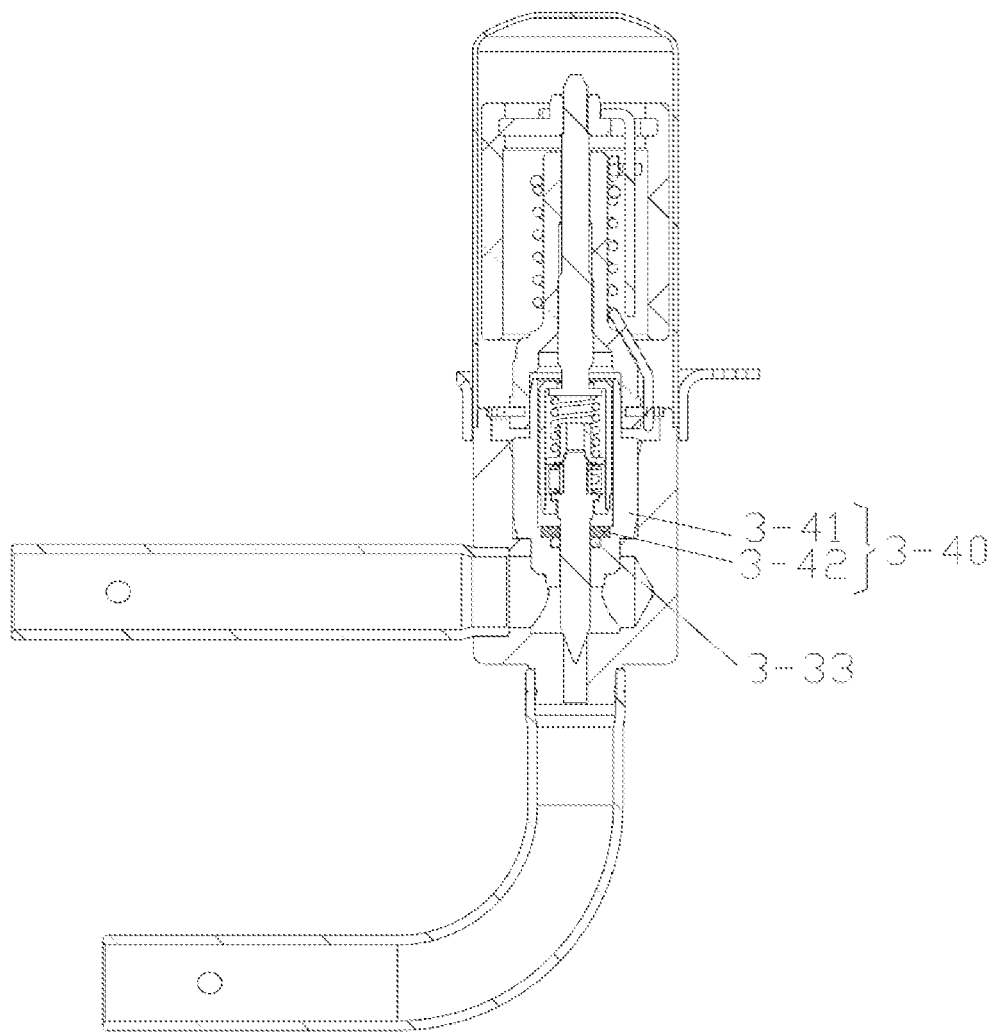
FIG. 12 shows a cross sectional view of another structure of the electronic expansion valve provided in FIG. 10.

As shown in FIG. 12, the difference between the technical solution of Embodiment 11 and the technical solution of Embodiment 8 lies in that the guide sleeve 3-40 further includes a pressing block groove provided between the first channel and the second channel and arranged coaxial with the first channel and the second channel, a first mounting groove is provided in a wall surface of one side, close to the first channel, of the second channel, a side, close to the connection sleeve assembly 3-35, of the first mounting groove is in communication with the pressing block groove, the fifth noise reduction member 3-33 is arranged in the first mounting groove, and the first pressing block 3-42 is fixed in the pressing block groove, so as to prevent the fifth noise reduction member 3-33 from moving close to the connection sleeve assembly 3-35. In some embodiments, the second mounting groove is an annular groove which is easy to machine, and the second mounting groove may also be machined into a groove with other shapes, for example, a spiral shape. The second mounting groove limits an axial movement of the sixth noise reduction member 3-34. The sixth noise reduction member 3-34 is in interference fit in the horizontal direction, and the sixth noise reduction member 3-34 is tightly pressed between the lead screw 3-31 and the nut seat 3-32, so as to reduce collision and noise. In some embodiments, the sixth noise reduction member 3-34 includes an elastic O-ring or a piston cup. The fifth noise reduction member 3-33 is mounted in the first mounting groove, and then the first pressing block 3-42 is mounted and fixed, such that the fifth noise reduction member 3-33 may be assembled more easily. The first pressing block 3-42 may be fixed by interference fit with the pressing block groove, may also be fixed by bonding or welding, and may also be fixed by a buckle structure or a bolt structure.

Figure 15:
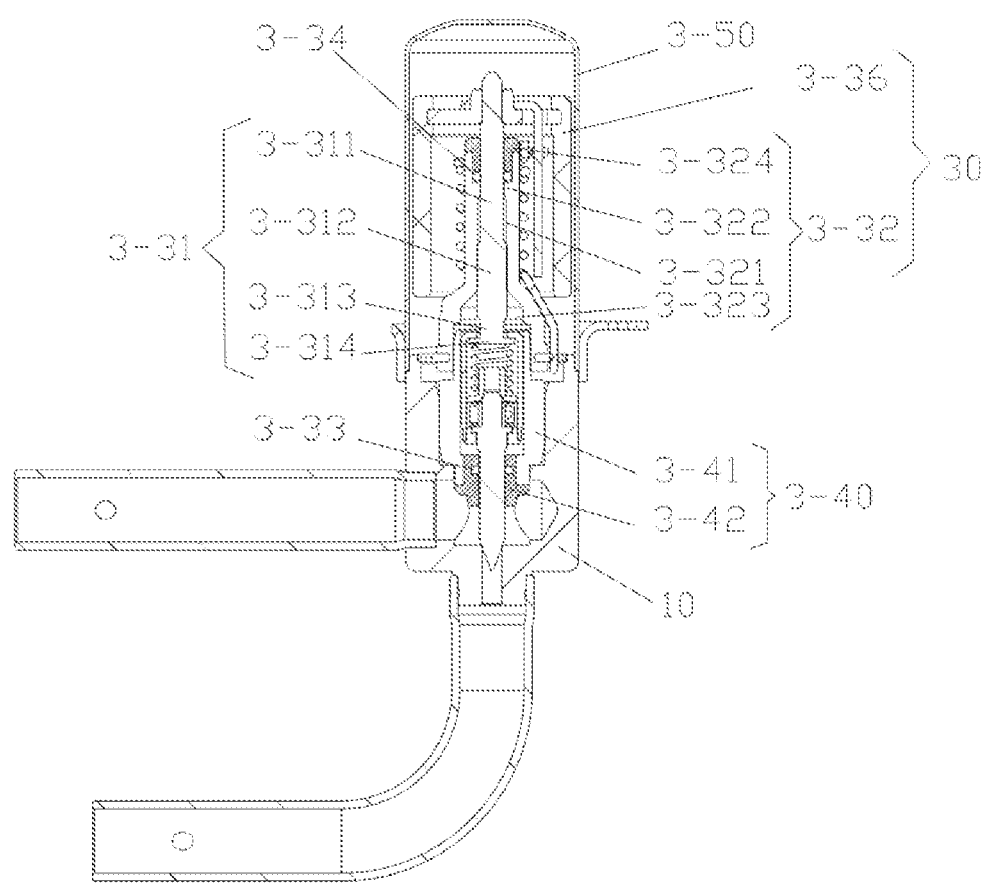
FIG. 15 shows a schematic cross sectional view of an electronic expansion valve provided in a tenth embodiment according to the present disclosure.

As shown in FIG. 15, the difference between the technical solution of Embodiment 12 and the technical solution of Embodiment 9 lies in that an annular groove is provided in one side, away from the connection sleeve assembly 3-35, of the guide sleeve body 3-41, the annular groove is connected with the first channel, the first pressing block 3-42 is mounted in the annular groove, the first pressing block 3-42 includes a second channel, the second channel is in communication with the first channel, the actuator 20 at least partially penetrates the first channel, the first channel is in clearance fit with the actuator 20, the first mounting groove is provided in the wall surface of the second channel, and the fifth noise reduction member 3-33 is at least partially mounted in the first mounting groove. In some embodiments, the second mounting groove is an annular groove which is easy to machine, and the second mounting groove may also be machined into a groove with other shapes, for example, a spiral shape. The second mounting groove limits an axial movement of the sixth noise reduction member 3-34. The sixth noise reduction member 3-34 is in interference fit in the horizontal direction, and the sixth noise reduction member 3-34 is tightly pressed between the lead screw 3-31 and the nut seat 3-32, so as to reduce collision and noise, and in some embodiments, the sixth noise reduction member 3-34 includes an elastic O-ring or a piston cup generally. The fifth noise reduction member 3-33 is mounted in the first mounting groove, and then the first pressing block 3-42 is mounted and fixed, such that the fifth noise reduction member 3-33 may be assembled more easily. The first pressing block 3-42 may be fixed by means of interference fit with the annular groove, may also be fixed by bonding or welding, and may also be fixed by a buckle structure or a bolt structure.

Embodiment 13

With reference to FIGS. 17-23, Embodiment 13 provides a valve seat component of an electronic expansion valve. The valve seat component includes a valve seat 10, a first connection pipe 4-2, and a welding ring 4-3, and may further include a second connection pipe 4-4. The electronic expansion valve is applied to a refrigeration apparatus and mounted between a liquid storage barrel and an evaporator, and a refrigerant in the liquid storage barrel is transferred to the evaporator by the electronic expansion valve.

Figure 23:
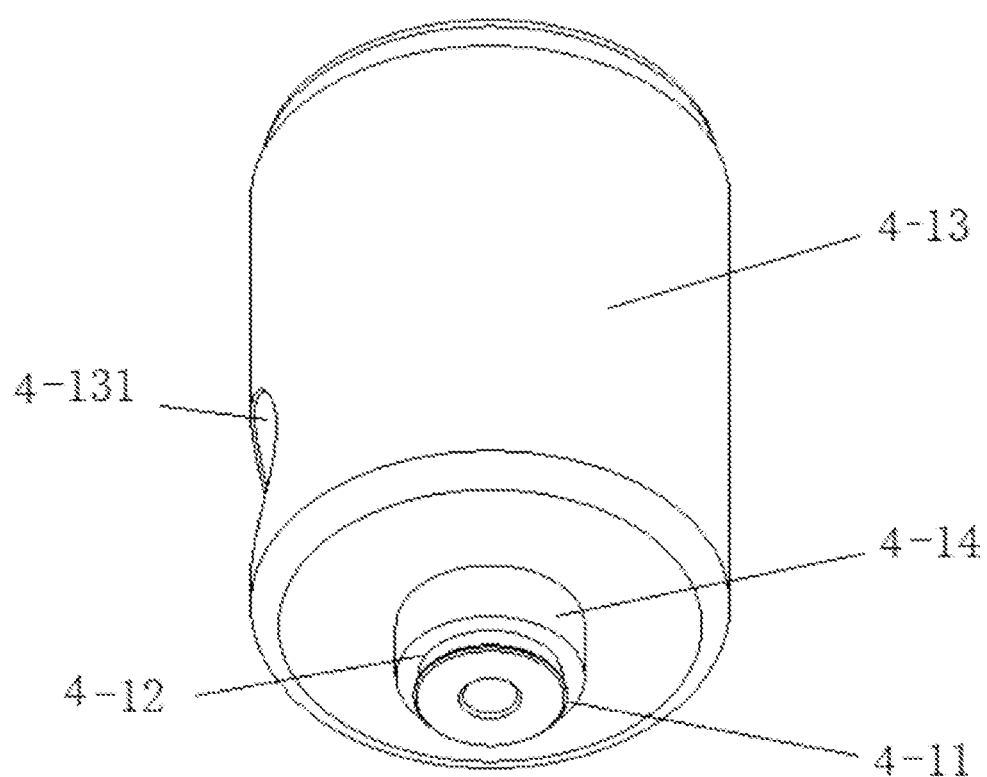
FIG. 23 shows a three-dimensional picture of a valve seat of an electronic expansion valve in FIG. 17.

With further reference to FIG. 23, one end of the valve seat 10 is provided with a boss structure 4-11 and provided with an annular groove structure 4-12 connected with the boss structure 4-11. In an embodiment, the valve seat 10 is made of material of a valve body of an existing expansion valve and may also has a size equal to that of a valve seat of the existing expansion valve. The valve seat 10 is cylindrical as a whole and may includes a plurality of sections which are sequentially connected, and the plurality of sections are coaxially arranged and in communication sequentially. The other end of the valve seat 10 is covered by a valve cover, to form a closed end. In some embodiments, the boss structure 4-11 is of a circular truncated cone shape, and a radius of one end, away from the annular groove structure 4-12, of the boss structure 4-11 is smaller. In some embodiments, a groove of the annular groove structure 4-12 may be an annular groove, may also be an annular groove with a rectangular cross section, and may also be a groove with another shapes. It should be noted here that the boss structure 4-11 and the annular groove structure 4-12 may be provided separately or integrally formed and are used as an end structure of the valve seat 10.

In embodiment 13, an accommodation cavity 4-16 is arranged in the valve seat 10, the accommodation cavity 4-16 is in communication with the first connection pipe 4-2 and the second connection pipe 4-4. The valve seat 10 includes a first mounting pipe 4-13 and a second mounting pipe 4-14, the first mounting pipe 4-13 and the second mounting pipe 4-14 are connected in an axial direction, and an outer diameter of the first mounting pipe 4-13 is larger than that of the second mounting pipe 4-14. The first connection pipe 4-2 sleeves the second mounting pipe 4-14, and the boss structure 4-11 and the annular groove structure 4-12 are arranged on the second mounting pipe 4-14. An insertion hole 4-131 is provided in a side wall of the first mounting pipe 4-13, and in some embodiments, the insertion hole 4-131 is a round hole.

In some embodiments, the first connection pipe 4-2 sleeves one end of the valve seat 10. The first connection pipe 4-2 includes a sleeve section 4-21 and an extension section 4-22, where a radius of the sleeve section 4-21 may be larger than a radius of the extension section 4-22, and certainly, the radius of the sleeve section 4-21 may also be equal to or smaller than the radius of the extension section 4-22. The sleeve section 4-21 sleeves the second mounting pipe 4-14 and is perpendicular to the first connection pipe 2, and the extension section 4-22 is connected to the sleeve section 4-21.

In some embodiments, a welding ring 4-3 is clamped into a groove of the annular groove structure 4-12 and connected with an inner wall of the first connection pipe 4-2, the valve seat 10 is in clearance fit with the first connection pipe 4-2, and the welding ring 4-3 is in interference fit with the first connection pipe 4-2. After the valve seat assembly is assembled, such an assembly mode may guarantee that the first connection pipe 4-2 is not prone to fall off, such that the valve seat 10 and the first connection pipe 4-2 are connected more stably, and the permeability of welding in the expansion valve is improved under the condition that the first connection pipe 4-2 is not prone to fall off. Moreover, the welding quality of the valve seat assembly is determined by appearance inspection in a mode of internally placing the welding ring.

In some embodiments, the welding ring 4-3 is clamped into a groove of the groove structure 4-12 by the boss structure 4-11, and the boss structure 4-11 may limit movement of the welding ring 4-3 to prevent the welding ring 4-3 from falling off from the valve seat 10. Moreover, when the valve seat 10 is connected with the first connection pipe 4-2, the welding ring 4-3 is fixed on the valve seat 10 in advance, and then the second mounting pipe 4-14 is inserted into the first connection pipe 4-2, so as to achieve automatic assembly and facilitate mounting of the welding ring 4-3. The second connection pipe 4-4 is inserted into the insertion hole 4-131 and in communication with the first connection pipe 4-2 by the valve seat 10. In some embodiments, the second connection pipe 4-4 is in communication with the liquid storage barrel, such that the refrigerant in the liquid storage barrel enters the accommodation cavity 4-16 and further enters the evaporator by the first connection pipe 4-2 to be used in the evaporator for evaporation and cooling.

In summary, compared to an electronic expansion valve known to inventors, the electronic expansion valve of this embodiment has the following advantages:

In the electronic expansion valve and the refrigeration system thereof according to this embodiment, a groove for accommodating a welding ring is designed on a valve seat 10 of the electronic expansion valve, so the welding ring 4-3 is limited on the valve seat 10 to guarantee a clearance fit between the valve seat 10 and a first connection pipe 4-2 and interference fit between the welding ring 4-3 and the first connection pipe 4-2, after the valve seat assembly is assembled, and the permeability of welding in the expansion valve is improved while the first connection pipe 4-2 is guaranteed not to be prone to fall off. Moreover, the welding quality of a valve seat assembly may be determined by appearance inspection in a mode of internally placing the welding ring. Moreover, the valve seat 10 is provided with a boss structure 4-11 connected to a groove structure 4-12, so the welding ring 4-3 is limited on the valve seat 10 and does not fall off, in this way, during assembly, the welding ring 4-3 may be mounted in the groove in advance, and then one end of the valve seat 10 and the welding ring 4-3 are inserted into the first connection pipe 4-2 together, so as to achieve automatic assembly and facilitate mounting of the welding ring 4-3.

Embodiment 14

This embodiment provides a refrigeration system. The refrigeration system may include various refrigeration devices and may also be applied to various refrigeration apparatuses. The refrigeration system in this embodiment includes a liquid storage container, an evaporator and a control valve, and the control valve is an electronic expansion valve in Embodiment 3. The liquid storage container stores a liquid refrigerant and is in communication with a second connection pipe 4-4 of the electronic expansion valve. The evaporator is in communication with a first connection pipe 4-2 of the electronic expansion valve and receives the refrigerant of the liquid storage container by the electronic expansion valve so as to achieve evaporative refrigeration. It is to be noted that the effect of the refrigeration system of this embodiment is identical to that of the electronic expansion valve in Embodiment 3, and the refrigeration system is applied as one system.

Embodiment 15

Figure 24:
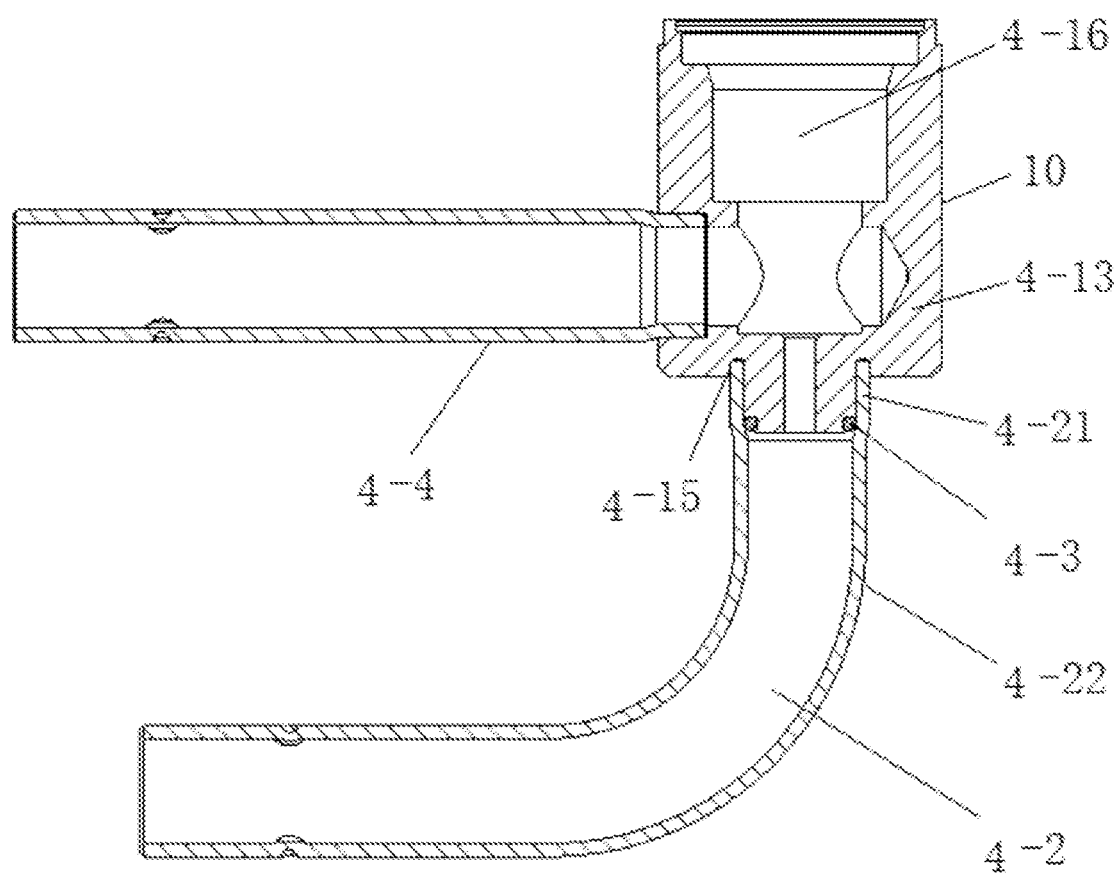
FIG. 24 shows a structure diagram of a valve seat assembly of an electronic expansion valve provided in a fifth embodiment according to the present disclosure.

With reference to FIG. 24, the embodiment provides an electronic expansion valve similar to the electronic expansion valve in Embodiment 13, the different lies that in this embodiment, one end, connected to the second mounting pipe 4-14, of the first mounting pipe 4-13 is provided with an annular slot 4-15, and the first connection pipe 4-2 is inserted into the annular slot 4-15. In this way, the first connection pipe 4-2 is fixed to the valve seat 10, and the problem that due to the problems about a pipe bending angle of the first connection pipe 4-2, a press-fitting apparatus tool, etc., or the reason of a too large gap, the first connection pipe 4-2 is inclined, and the gap is provided between the valve seat 10 and the first connection pipe 4-2, so welding flux is not full is avoided.

Embodiment 16

Figure 25:
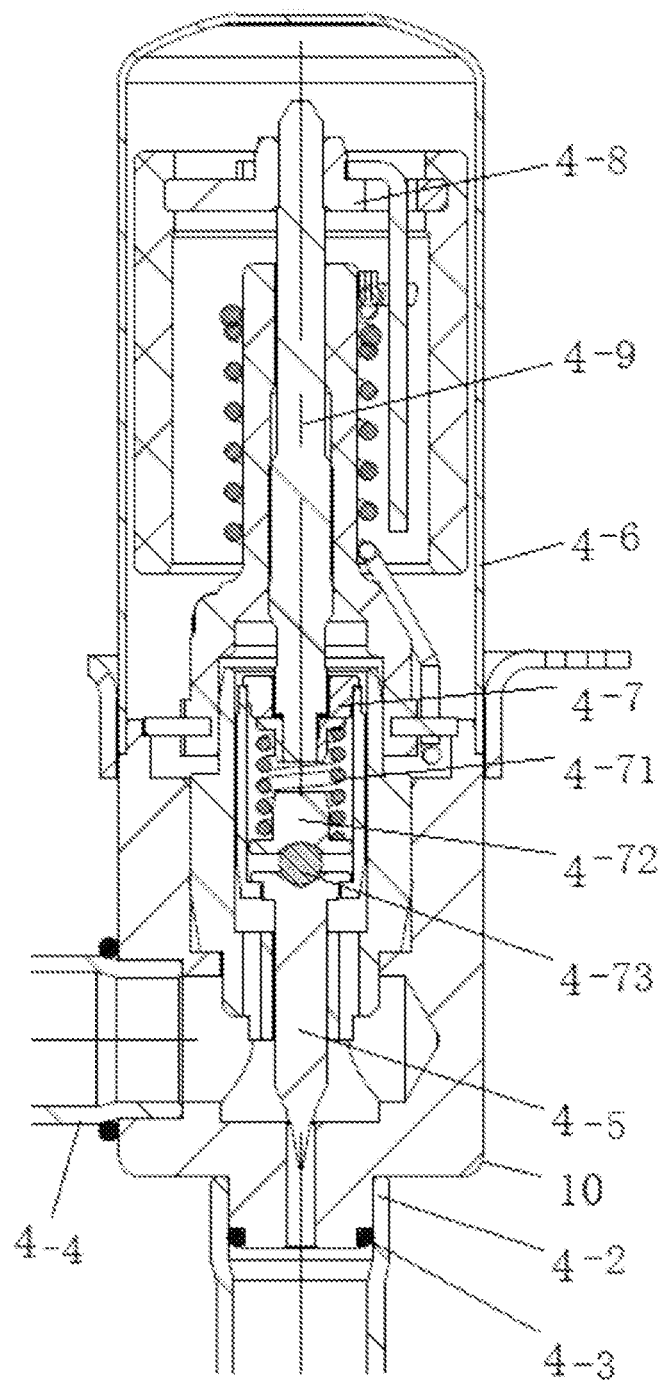
FIG. 25 shows a structure diagram of an electronic expansion valve provided in a sixth embodiment according to the present disclosure.

With reference to FIG. 25, the embodiment provides an electronic expansion valve. The electronic expansion valve is additionally provided with a valve needle 4-5, a cover body 4-6, a lifting assembly 4-7, a rotor assembly 4-8 and a lead screw assembly 4-9 on the basis of Embodiment 13. An accommodation cavity 4-16 is arranged in the valve seat 10, the accommodation cavity 4-16 is in communication with the first connection pipe 4-2 and the second connection pipe 4-4. Specifically, the cover body 4-6 is mounted on the valve seat 10, and the accommodation cavity 4-16 is defined by the cover body 4-6 and the valve seat 10.

The valve needle 4-5 is arranged in the valve seat 10 and provided with a needle head arranged towards the second mounting pipe 4-14, a maximum outer diameter of the needle head is larger than an inner diameter of the second mounting pipe 4-14. The lifting assembly 4-7 is arranged in the accommodation cavity 4-16, has a central axis coinciding with a central axis of the valve seat 10, and is configured to rotate to drive the valve needle 4-5 to ascend and descend along the central axis of the valve seat 10. The rotor assembly 4-8 is rotationally mounted in the cover body 4-6, the lead screw assembly 4-9 is mounted in the cover body 4-6 and having an axial limiting end connected with the lifting assembly 4-7. The rotor assembly 4-8 is arranged around the lead screw assembly 4-9 and is configured to drive the lead screw assembly 4-9 to rotate and axially move. In this way, the rotor assembly 4-8 rotates the lifting assembly 4-7 and drives the valve needle 4-5 to ascend and descend by means of rotation of the rotor assembly 4-8, and therefore the gap between the needle head and the second mounting pipe 4-14 changes.

In some embodiments, the lifting assembly 4-7 includes a spring 4-71, a gasket 4-72 and a ball 4-73. The spring 4-71 is arranged in the lifting assembly 4-7, one end of the spring 4-71 is connected with the lead screw assembly 4-9, and the other end of the spring 4-71 is connected with the gasket 4-72 and connected to the valve needle 4-5 by the ball 4-73. The ball 4-73 is placed between the gasket 4-72 and the valve needle 4-5, and two ends of the ball 4-73 slide on a side wall of the valve seat 10 in a direction of a central axis of the valve seat 10, so as to reduce friction of the lifting assembly to the valve needle in a process of rotating and moving in the direction of the central axis of the valve seat under the driving of the lead screw assembly. The lifting assembly 4-7 rotates and moves up and down along with the lead screw assembly 4-9, and then the valve needle 4-5 is lifted, so as to control a size of the gap between the needle head and the second mounting pipe 4-14.

When flow of the electronic expansion valve needs to be adjusted, a user may control a stator assembly to drive the rotor assembly 4-8 to rotate, so that the valve needle 4-5 moves in the axial direction of the valve seat 10, the gap between the needle head and the second mounting pipe 4-14 is increased or decreased, so as to control the flow, therefore a refrigeration effect of an evaporator is controlled, and moreover, phenomena of insufficient evaporator area utilization and cylinder knocking are prevented.

Embodiment 17

The embodiment provides an electronic expansion valve. The electronic expansion valve is additionally provided with a thermistor on the basis of Embodiment 13. The thermistor is arranged at an outlet of an evaporator and connected in parallel to a stator assembly fixed on a positioning sheet of a valve seat 10 and then to a power supply. A resistance value of the thermistor changes along with a change of temperature, so voltage at two ends of the stator assembly changes along with the change of the temperature, and then a position of a valve needle 4-5 changes along with the change of the temperature, thereby adjusting a flow of the electronic expansion valve.

Those of ordinary skill in the art will recognize that the above embodiments are merely illustrative of the present disclosure and are not intended to be limiting of the present disclosure, as long as appropriate changes and variations to the above embodiments fall within the scope of protection of the claimed disclosure, within the true spirit of the present disclosure.

The foregoing are merely some embodiments of the present disclosure and is not intended to limit the present disclosure, and various changes and modifications may be made by those skilled in the art. Any modifications, equivalent substitutions, improvements, and the like within the spirit and principles of the present disclosure are intended to be included within the scope of protection of the present disclosure.

What is claimed is:

1. An electronic expansion valve, comprising:
   a valve seat (10) provided with an inlet (11), an outlet (12) and a communication channel (13) in communication with the inlet (11) and the outlet (12);
   an actuator (20) movably mounted in the valve seat (10), wherein the actuator (20) is provided with a first position to block the communication channel (13) and a second position to avoid the communication channel (13); and
   a driving mechanism (30) connected to the actuator (20) to drive the actuator (20) to move between the first position and the second position, wherein the driving mechanism (30) comprises at least one noise reduction members to reduce noise of the electronic expansion valve;
   wherein the driving mechanism (30) further comprises a connection sleeve assembly (1-35), a guide sleeve (1-40) and a first noise reduction member (1-33) in the at least one noise reduction member, the guide sleeve (1-40) being fixed in the valve seat (10), the connection sleeve assembly (1-35) being connected to the actuator (20), the connection sleeve assembly (1-35) being movably arranged in the guide sleeve (1-40), and the first noise reduction member (1-33) being arranged between the guide sleeve (1-40) and the connection sleeve assembly (1-35).

2. The electronic expansion valve according to claim 1, wherein the guide sleeve (1-40) comprises a first channel (1-401) and a second channel (1-402) which are in communication, the second channel (1-402) being in communication with the communication channel (13) of the valve seat (10), the connection sleeve assembly (1-35) is movably arranged in the first channel (1-401), the actuator (20) is at least partially arranged in the second channel (1-402), and the first noise reduction member (1-33) is arranged between the first channel (1-401) and the connection sleeve assembly (1-35).

3. The electronic expansion valve according to claim 2, wherein a first mounting groove is provided in an outer wall of the connection sleeve assembly (1-35) and/or an inner wall of the first channel (1-401), and the first noise reduction member (1-33) is mounted in the first mounting groove.

4. The electronic expansion valve according to claim 1, wherein the driving mechanism (30) further comprises a rotor (1-36), a lead screw (1-31), a nut seat (1-32) and a second noise reduction member (1-34) in the at least one noise reduction member, the rotor (1-36) being connected to the lead screw (1-31), the lead screw (1-31) penetrating into the nut seat (1-32), the lead screw (1-31) being connected to the actuator (20) by the connection sleeve assembly (1-35), and the second noise reduction member (1-34) being arranged between the lead screw (1-31) and the nut seat (1-32).

5. The electronic expansion valve according to claim 4, wherein the lead screw (1-31) comprises a guide section (1-311), an external thread section (1-312) and a transition section (1-315), a first end of the transition section (1-315) being connected with an end, close to the actuator (20), of the external thread section (1-312), and a second end of the transition section (1-315) being connected with the guide section (1-311).

6. A refrigeration system, comprising a liquid storage container, an evaporator, and a control valve, wherein a refrigerant in the liquid storage container is transferred to the evaporator by the control valve, and the control valve is the electronic expansion valve according to claim 1.

7. An electronic expansion valve, comprising:
   a valve seat (10) provided with an inlet (11), an outlet (12) and a communication channel (13) in communication with the inlet (11) and the outlet (12);
   an actuator (20) movably mounted in the valve seat (10), wherein the actuator (20) is provided with a first position to block the communication channel (13) and a second position to avoid the communication channel (13); and
   a driving mechanism (30) connected to the actuator (20) to drive the actuator (20) to move between the first position and the second position, wherein the driving mechanism (30) comprises at least one noise reduction member to reduce noise of the electronic expansion valve, wherein the driving mechanism (30) further comprises a rotor (1-36), a lead screw (1-31), a nut seat (1-32) and a second noise reduction member (1-34) in the at least one noise reduction member, the rotor (1-36) being connected to the lead screw (1-31), the lead screw (1-31) penetrating into the nut seat (1-32), the lead screw (1-31) being connected to the actuator (20) by a connection sleeve assembly (1-35), and the second noise reduction member (1-34) being arranged between the lead screw (1-31) and the nut seat (1-32);
   wherein the lead screw (1-31) comprises a guide section (1-311), an external thread section (1-312) and a transition section (1-315), a first end of the transition section (1-315) being connected with an end, close to the actuator (20), of the external thread section (1-312), and a second end of the transition section (1-315) being connected with the guide section (1-311).

8. The electronic expansion valve according to claim 7, wherein the nut seat (1-32) comprises an internal thread section (1-321) and an unthreaded hole section (1-322), wherein the external thread section (1-312) cooperates with the internal thread section (1-321), the guide section (1-311) is arranged corresponding to the unthreaded hole section (1-322), the guide section (1-311) is in clearance fit with the unthreaded hole section (1-322), and a nominal diameter of the external thread section (1-312) is smaller than an inner diameter of the unthreaded hole section (1-322).

9. The electronic expansion valve according to claim 8, wherein a second mounting groove is provided in the guide section (1-311) and/or the unthreaded hole section (1-322), and the second noise reduction member (1-34) is mounted in the second mounting groove.

10. The electronic expansion valve according to claim 8, wherein the nut seat (1-32) further comprises an open groove (1-323), the open groove (1-323) being in communication with the unthreaded hole section (1-322), and an inner diameter of the open groove (1-323) being larger than the inner diameter of the unthreaded hole section (1-322), and the guide sleeve (1-40) is at least partially clamped in the open groove (1-323).

11. An electronic expansion valve, comprising:
a valve seat (10) provided with an inlet (11), an outlet (12) and a communication channel (13) in communication with the inlet (11) and the outlet (12);
an actuator (20) movably mounted in the valve seat (10), wherein the actuator (20) is provided with a first position to block the communication channel (13) and a second position to avoid the communication channel (13); and
a driving mechanism (30) connected to the actuator (20) to drive the actuator (20) to move between the first position and the second position, wherein the driving mechanism (30) comprises at least one noise reduction member to reduce noise of the electronic expansion valve; wherein the driving mechanism (30) further comprises a lead screw (2-31), a nut seat (2-32) and a third noise reduction member (2-33) in the at least one noise reduction member, the lead screw (2-31) penetrating into the nut seat (2-32), and the third noise reduction member (2-33) being arranged between the lead screw (2-31) and the nut seat (2-32); wherein the lead screw (2-31) comprises a fixed section (2-311) and an external thread section (2-312), and the nut seat (2-32) comprises an internal thread section (2-321) and an unthreaded hole section (2-322), the external thread section (2-312) cooperating with the internal thread section (2-321), the fixed section (2-311) being arranged corresponding to the unthreaded hole section (2-322), and the third noise reduction member (2-33) being located between the fixed section (2-311) and the unthreaded hole section (2-322).

12. The electronic expansion valve according to claim 11, wherein the fixed section (2-311) is located on a side, away from the actuator (20), of the external thread section (2-312); or, a first mounting portion is arranged on the fixed section (2-311) and/or the unthreaded hole section (2-322), and the third noise reduction member (2-33) is at least partially mounted in the first mounting portion.

13. The electronic expansion valve according to claim 11, wherein the driving mechanism (30) further comprises a guide sleeve (2-40), a connection sleeve assembly (2-35) and a fourth noise reduction member (2-34) in the at least one noise reduction member, the guide sleeve (2-40) being located in the valve seat (10), and the connection sleeve assembly (2-35) being at least partially located in the guide sleeve (2-40), and the lead screw (2-31) is connected to the actuator (20) by the connection sleeve assembly (2-35), the fourth noise reduction member (2-34) is arranged between the guide sleeve (2-40) and the connection sleeve assembly (2-35).

14. The electronic expansion valve according to claim 13, wherein a second mounting portion is provided on an outer wall of the connection sleeve assembly (2-35) and/or an inner wall of the guide sleeve (2-40), and the fourth noise reduction member (2-34) is at least partially mounted in the second mounting portion.

15. An electronic expansion valve, comprising:
a valve seat (10) provided with an inlet (11), an outlet (12) and a communication channel (13) in communication with the inlet (11) and the outlet (12);
an actuator (20) movably mounted in the valve seat (10), wherein the actuator (20) is provided with a first position to block the communication channel (13) and a second position to avoid the communication channel (13); and
a driving mechanism (30) connected to the actuator (20) to drive the actuator (20) to move between the first position and the second position, wherein the driving mechanism (30) comprises at least one noise reduction member to reduce noise of the electronic expansion valve; wherein the driving mechanism (30) comprises a guide sleeve (3-40) and a fifth noise reduction member (3-33) in the at least one noise reduction member, the guide sleeve (3-40) being located in the valve seat (10), the actuator (20) being at least partially arranged in the guide sleeve (3-40), and the fifth noise reduction member (3-33) being arranged between the guide sleeve (3-40) and the actuator (20).

16. The electronic expansion valve according to claim 15, wherein the driving mechanism (30) further comprises a rotor (3-36), a lead screw (3-31), a nut seat (3-32) and a connection sleeve assembly (3-35), the rotor (3-36) being connected to the lead screw (3-31), the lead screw (3-31) penetrating into the nut seat (3-32), the connection sleeve assembly (3-35) being located in the guide sleeve (3-40), and the lead screw (3-31) being connected to the actuator (20) by the connection sleeve assembly (3-35).

17. The electronic expansion valve according to claim 16, wherein the guide sleeve (3-40) comprises a first channel and a second channel which are connected and coaxial, the first channel being located on a side, away from the inlet (11), of the second channel, and the second channel being in communication with the communication channel (13) of the valve seat (10), the connection sleeve assembly (3-35) is arranged in the first channel, the actuator (20) is at least partially arranged in the second channel, and the fifth noise reduction member (3-33) is arranged between the actuator (20) and a wall surface of the second channel.

18. The electronic expansion valve according to claim 17, wherein a first mounting groove is provided in an outer wall of the actuator (20) and/or the wall surface of the second channel, and the fifth noise reduction member (3-33) is at least partially mounted in the first mounting groove.

19. The electronic expansion valve according to claim 17, wherein the guide sleeve (3-40) comprises a guide sleeve body (3-41) and a first pressing block (3-42), the first pressing block (3-42) being detachably fixed on the guide sleeve body (3-41), and the first pressing block (3-42) being provided with a first through hole, the actuator (20) at least partially penetrates the first through hole, and the fifth noise reduction member (3-33) is arranged between the guide sleeve body (3-41) and the first pressing block (3-42).

20. The electronic expansion valve according to claim 19, wherein in a direction from a position close to the inlet (11) to a position away from the inlet (11), the second channel sequentially comprises a first sub-channel section (3-401), a second sub-channel section (3-402) and a third sub-channel section (3-403), a diameter of the first sub-channel section (3-401) being larger than a diameter of the second sub-channel section (3-402), and the diameter of the second sub-channel section (3-402) being larger than a diameter of the third sub-channel section (3-403), an outer diameter of the actuator (20) matches the third sub-channel section (3-403), wherein the first pressing block (3-42) sequentially comprises a first step section and a second step section in a direction from a position away from the inlet (11) to a position close to the inlet (11), the first step section is nested in the first sub-channel section (3-401), and the fifth noise reduction member (3-33) is arranged in a space defined by an end face of the first step section, the second channel section (3-402) and the actuator (20); or the guide sleeve (3-40) further comprises a pressing block groove provided between the first channel and the second channel and coaxial with the first channel and the second channel, wherein a first mounting groove is provided in a wall surface of a side, close to the first channel, of the second channel; a side surface, close to the connection sleeve assembly (3-35), of the first mounting groove is in communication with the pressing block groove, the fifth noise reduction member (3-33) is arranged in the first mounting groove, and the first pressing block (3-42) is fixed in the pressing block groove, so as to prevent the fifth noise reduction member (3-33) from moving close to the connection sleeve assembly (3-35); or an annular groove is provided in a side, away from the connection sleeve assembly (3-35), of the guide sleeve body (3-41), the annular groove is connected with the first channel, the first pressing block (3-42) is mounted in the annular groove, the actuator (20) at least partially penetrates the first channel, the first channel is in clearance fit with the actuator (20), the first mounting groove is provided in the wall surface of the second channel, and the fifth noise reduction member (3-33) is at least partially mounted in the first mounting groove.

21. The electronic expansion valve according to claim 16, wherein the driving mechanism (30) further comprises a sixth noise reduction member (3-34) in the at least one noise reduction member, the six noise reduction member (3-34) being arranged between the lead screw (3-31) and the nut seat (3-32).

22. The electronic expansion valve according to claim 21, wherein the lead screw (3-31) comprises a fixed section (3-311) and an external thread section (3-312), the fixed section (3-311) being located on a side, away from the actuator (20), of the external thread section (3-312), and the nut seat (3-32) comprises an internal thread section (3-321) and an unthreaded hole section (3-322), the external thread section (3-312) cooperating with the internal thread section (3-321), and the fixed section (3-311) being arranged corresponding to the unthreaded hole section (3-322).

23. The electronic expansion valve according to claim 22, wherein a second mounting groove is provided in an outer wall of the fixed section (3-311) and/or an inner wall of the unthreaded hole section (3-322), and the six noise reduction member (3-34) is at least partially mounted in the second mounting groove.

24. The electronic expansion valve according to claim 23, wherein the nut seat (3-32) further comprises a second pressing block (3-324), the second pressing block (3-324) being detachably arranged on a side, away from the actuator (20), of the unthreaded hole section (3-322), the electronic expansion valve comprises a second mounting groove, wherein the second mounting groove is provided in an end face, connected to the second pressing block (3-324), of the unthreaded hole section (3-322), and the six noise reduction member (3-34) is at least partially mounted in the second mounting groove.

25. An electronic expansion valve, comprising:
a valve seat (10) provided with an inlet (11), an outlet (12) and a communication channel (13) in communication with the inlet (11) and the outlet (12);
an actuator (20) movably mounted in the valve seat (10), wherein the actuator (20) is provided with a first position to block the communication channel (13) and a second position to avoid the communication channel (13); and
a driving mechanism (30) connected to the actuator (20) to drive the actuator (20) to move between the first position and the second position, wherein the driving mechanism (30) comprises at least one noise reduction member to reduce noise of the electronic expansion valve, wherein the electronic expansion valve comprises:
a first connection pipe (4-2) sleeved an end of the valve seat (10); wherein
the end of the valve seat (10) is provided with an annular groove structure (4-12) and provided with a boss structure (4-11) connected to the annular groove structure (4-12);
a welding ring (4-3) clamped into a groove of the annular groove structure (4-12) and connected to an inner wall of the first connection pipe (4-2); and
the valve seat (10) is in clearance fit with the first connection pipe (4-2), and the welding ring (4-3) is in interference fit with the first connection pipe (4-2).

26. The electronic expansion valve according to claim 25, wherein the valve seat (10) comprises a first mounting pipe (4-13) and a second mounting pipe (4-14) connected in an axial direction, wherein an outer diameter of the first mounting pipe (4-13) is larger than an outer diameter of the second mounting pipe (4-14), the first connection pipe (4-2) sleeves the second mounting pipe (4-14), and the boss structure (4-11) and the annular groove structure (4-12) are arranged on the second mounting pipe (4-14).

27. The electronic expansion valve according to claim 26, wherein a side wall of the first mounting pipe (4-13) is provided with an insertion hole (4-131); and the electronic expansion valve further comprises:
a second connection pipe (4-4) inserted into the insertion hole (4-131) and in communication with the first connection pipe (4-2) by the valve seat (10).

28. The electronic expansion valve according to claim 27, wherein an accommodation cavity (4-16) is arranged in the valve seat (10), the accommodation cavity (4-16) being in communication with the first connection pipe (4-2) and the second connection pipe (4-4); and the electronic expansion valve further comprises:
a valve needle (4-5) arranged in the valve seat (10) and provided with a needle head arranged towards the second mounting pipe (4-14), a maximum outer diameter of the needle head being larger than an inner diameter of the second mounting pipe (4-14).

29. The electronic expansion valve according to claim 28, further comprising:
a cover body (4-6) mounted on the valve seat (10), the accommodation cavity (4-16) being defined by the cover body (4-6) and the valve seat (10);
a lifting assembly (4-7) arranged in the accommodation cavity (4-16), having a central axis coinciding with a central axis of the valve seat (10), and configured to rotate to drive the valve needle (4-5) to ascend and descend along the central axis of the valve seat (10);
a rotor assembly (4-8) rotationally mounted in the cover body (4-6); and
a lead screw assembly (4-9) mounted in the cover body (4-6) and having an axial limiting end connected to the lifting assembly (4-7), wherein the rotor assembly (4-8) is arranged around the lead screw assembly (4-9) and is configured to drive the lead screw assembly (4-9) to rotate and axially move.

30. The electronic expansion valve according to claim 29, wherein the lifting assembly (4-7) comprises a spring (4-71), a gasket (4-72) and a ball (4-73); the spring (4-71) is mounted in the lifting assembly (4-7), one end of the spring is connected to the lead screw assembly (4-9), the other end of the spring is connected to the gasket (4-72) and is connected to the valve needle (4-5) by the ball (4-73), and the ball (4-73) is disposed between the gasket (4-72) and the valve needle (4-5).

31. The electronic expansion valve according to claim 30, wherein the electronic expansion valve is mounted between a liquid storage barrel and an evaporator, and a refrigerant in the liquid storage barrel is transferred to the evaporator by the electronic expansion valve; and the electronic expansion valve further comprises:
- a thermistor arranged at an outlet of the evaporator and connected in parallel to a stator assembly fixed on a positioning sheet of the valve seat (10) and then to a power supply.

32. The electronic expansion valve according to claim 26, wherein the first connection pipe (4-2) comprises a sleeve section (4-21) and an extension section (4-22); the sleeve section (4-21) sleeves on the second mounting pipe (4-14) and is perpendicular to the first connection pipe (4-2); and the extension section (4-22) is connected to the sleeve section (4-21); or
- an end, connected to the second mounting pipe (4-14), of the first mounting pipe (4-13) is provided with an annular slot (4-15), and the first connection pipe (4-2) is inserted into the annular slot (4-15).

\* \* \* \* \*